(12) United States Patent
He et al.

(10) Patent No.: US 11,982,859 B2
(45) Date of Patent: May 14, 2024

(54) LENS, ACTIVE LIGHT EMITTING MODULE, AND TERMINAL

(71) Applicant: Huawei Technologies Co., Ltd., Shenzhen (CN)

(72) Inventors: Yingyong He, Shenzhen (CN); Wei Tang, Tokyo (JP); Bin Shi, Tokyo (JP)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 609 days.

(21) Appl. No.: 17/285,207

(22) PCT Filed: Oct. 12, 2019

(86) PCT No.: PCT/CN2019/110842
§ 371 (c)(1),
(2) Date: Apr. 14, 2021

(87) PCT Pub. No.: WO2020/078285
PCT Pub. Date: Apr. 23, 2020

(65) Prior Publication Data
US 2021/0341702 A1 Nov. 4, 2021

(30) Foreign Application Priority Data
Oct. 15, 2018 (CN) .......................... 201811198378.1

(51) Int. Cl.
G02B 7/02 (2021.01)
G01B 11/25 (2006.01)
(Continued)

(52) U.S. Cl.
CPC .............. *G02B 7/02* (2013.01); *H04M 1/026* (2013.01); *H05F 3/00* (2013.01); *G01B 11/254* (2013.01)

(58) Field of Classification Search
CPC ...... G02B 7/02; H04M 1/026; H04M 1/0264; H04M 1/0266; H04M 2250/02;
(Continued)

(56) References Cited

U.S. PATENT DOCUMENTS

| 11,385,500 | B2* | 7/2022 | Jang | ................. | G02F 1/133612 |
| 11,703,718 | B2* | 7/2023 | Jang | ................. | G02F 1/133612 349/62 |

(Continued)

FOREIGN PATENT DOCUMENTS

| CN | 203278998 U | 11/2013 |
| CN | 203422515 U | 2/2014 |

(Continued)

Primary Examiner — Quan Zhen Wang
Assistant Examiner — Rajsheed O Black-Childress
(74) Attorney, Agent, or Firm — Conley Rose, P.C.

(57) ABSTRACT

A lens includes a lens tube and the optical element mounted in the lens tube. The lens tube has a top surface, and a conductive layer is disposed on a surface that is of the optical element and that faces a side on which the top surface is located. The lens further includes antistatic structure disposed on the top surface, and an electrostatic conducting wire disposed in a tube wall or on an inner surface or an (Continued)

outer surface of the lens tube. One end of the electrostatic conducting wire is electrically coupled to the antistatic structure, and the other end is grounded.

20 Claims, 27 Drawing Sheets

(51) Int. Cl.
*H04M 1/02* (2006.01)
*H05F 3/00* (2006.01)

(58) Field of Classification Search
CPC ......... H04M 2250/04; H04M 2250/06; H04M 2250/12; H04M 2250/22; H05F 3/00; G01B 11/254; G01S 17/89; G06F 1/1686; G06F 3/013; G06F 3/017; G06F 21/32; G06F 3/044; G06F 3/04883; G06F 2203/04104; G06F 2203/04108
See application file for complete search history.

(56) References Cited

U.S. PATENT DOCUMENTS

| | | |
|---|---|---|
| 2005/0032267 A1 | 2/2005 | Liu et al. |
| 2010/0258891 A1 | 10/2010 | Jow |
| 2014/0362243 A1 | 12/2014 | Han |
| 2015/0077654 A1 | 3/2015 | Chu et al. |
| 2015/0163478 A1 | 6/2015 | Geiss et al. |
| 2016/0118614 A1 | 4/2016 | Seo et al. |
| 2017/0150118 A1 | 5/2017 | Pacheco et al. |
| 2019/0028624 A1 | 1/2019 | Choi |
| 2021/0341702 A1 | 11/2021 | He et al. |

FOREIGN PATENT DOCUMENTS

| | | |
|---|---|---|
| CN | 104067168 A | 9/2014 |
| CN | 205750071 U | 11/2016 |
| CN | 107454295 A | 12/2017 |
| CN | 206835231 U | 1/2018 |
| CN | 107800939 A | 3/2018 |
| CN | 107870186 A | 4/2018 |
| CN | 207283659 U | 4/2018 |
| CN | 108319034 A | 7/2018 |
| CN | 108333706 A | 7/2018 |
| CN | 108449450 A | 8/2018 |
| CN | 108541373 A | 9/2018 |
| CN | 108594563 A | 9/2018 |
| CN | 109379460 A | 2/2019 |
| JP | 2005051430 A | 2/2005 |
| JP | 2013026973 A | 2/2013 |
| JP | 2015169924 A | 9/2015 |
| KR | 20050020516 A | 3/2005 |
| KR | 20060080916 A | 7/2006 |
| KR | 20170003846 A | 1/2017 |
| TW | 201011840 A | 3/2010 |

* cited by examiner

LENS, ACTIVE LIGHT EMITTING MODULE, AND TERMINAL

CROSS-REFERENCE TO RELATED APPLICATIONS

This application is a U.S. National Stage of International Patent Application No. PCT/CN2019/110842 filed on Oct. 12, 2019, which claims priority to Chinese Patent Application No. 201811198378.1 filed on Oct. 15, 2018. Both of the aforementioned applications are hereby incorporated by reference in their entireties.

TECHNICAL FIELD

The present invention relates to the field of electronic terminal device technologies, and in particular, to a lens, an active light emitting module, and a terminal.

BACKGROUND

Currently, a 3D sensing technology is a hot research topic in an electronic terminal device (for example, a mobile phone) field. The 3D sensing technology is a deep sensing technology that can further improve a facial recognition or iris recognition function and enhance a facial and object recognition function of a terminal camera, and is applicable to functions such as augmented reality, a game, and self-driving.

Active light emitting modules such as structured light and a ToF (Time Of Flight, time of flight) are integrated into a terminal so that a 3D sensing function can be implemented. This type of active light emitting module usually includes a laser and a lens disposed in a light emitting direction of the laser. The laser can emit laser light, and the lens includes an optical element such as a diffractive optical element (Diffractive Optical Element, DOE for short) or a diffuser (Diffuser) that is configured to disperse light or diffuse light. If the optical element such as the diffractive optical element or the diffuser in the lens is damaged or falls off the laser light emitted by the laser may leak out, and direct exposure of the laser light to human eyes may damage human eye vision. Therefore, a damage or fall-off status of the optical element such as the diffractive optical element or the diffuser needs to be monitored.

By disposing a conductive layer on a surface of the optical element, a change of an electrical signal on the conductive layer is monitored in real time, so that the damage or fall-off status of the optical element can be monitored. However, in processes such as production of an optical element, assembly of an active light emitting module, and use of a terminal, static electricity is generated. The static electricity enters the conductive layer, and damages the conductive layer. Consequently, a monitoring function, of the conductive layer fails.

SUMMARY

The present invention provides a lens, an active light conning module, and a terminal, to protect a conductive layer on an optical element and reduce a risk that the conductive layer is damaged by static electricity.

To achieve the foregoing objective, the following technical solutions are used in the present invention.

According to a first aspect of the present invention, a lens is provided. The lens includes a lens tube and an optical element mounted in the lens tube. The lens tube has a top surface, and a conductive layer is disposed on a surface that is of the optical element and that faces a side on which the top surface is located. The lens further includes: an antistatic structure disposed on the top surface, and an electrostatic conducting wire disposed in a tube wall or on an inner surface or an outer surface of the lens tube. One end of the electrostatic conducting wire is electrically connected to the antistatic structure, and the other end is grounded, in this way, the antistatic structure can guide static electricity passing through the antistatic structure to a ground terminal through the electrostatic conducting wire. The antistatic structure can further absorb static electricity near the antistatic structure, and then guide the absorbed static electricity to the ground terminal through the electrostatic conducting wire. In this way, the antistatic structure guides at least a part of static electricity close to the conductive layer to the ground terminal, reduces an amount of static electricity entering the conductive layer, and effectively reduces a risk that the conductive layer is damaged by the static electricity.

With reference to the first aspect, in a possible design, the antistatic structure includes a frame-shaped conductive film. An orthographic projection of the frame-shaped conductive film on a plane defined by the optical element surrounds the conductive layer. The frame-shaped conductive film is electrically connected to the electrostatic conducting wire. In this way, the antistatic structure completely surrounds the conductive layer within an area framed by the antistatic structure, so that static electricity from all areas around the conductive layer can be guided to the ground terminal, greatly improving an antistatic effect of the antistatic structure on the conductive layer.

With reference to the first aspect, in a possible design, the antistatic structure includes an antistatic electrode, and the antistatic electrode is electrically connected to the electrostatic conducting wire. Alternatively, the antistatic structure includes a plurality of antistatic electrodes and at least one first electrode connection wire. The plurality of antistatic electrodes are electrically connected to each other through the at least one first electrode connection wire. One of the plurality of antistatic electrodes is electrically connected to the electrostatic conducting wire. In this way, static electricity passing through the antistatic electrode and static electricity around the antistatic electrode are guided to the ground terminal through the antistatic electrode, reducing the amount of the static electricity entering the conductive layer.

With reference to the first aspect, in a possible design, the conductive layer includes a detection line. The lens further includes two conducting wires. The two conducting wires are disposed inside the tube wall or on the inner surface or the outer surface of the lens tube, two ends of the detection line are respectively connected to an external positive terminal and an external negative terminal through the two conducting wires, and the negative terminal is grounded. The electrostatic conducting wire and the conducting wire connected to the negative terminal are configured as a same conductive line, to simplify a structure and a manufacturing process of the lens.

Optionally, the lens further includes a second electrode connection wire. One end of the second electrode connection wire is electrically connected to the antistatic structure, and the other cud is electrically connected to the conducting wire connected to the negative terminal. In this way, the antistatic structure is electrically connected, through the second electrode connection wire, to the conducting wire that is connected to the negative terminal and that is grounded, so that the antistatic structure is grounded.

Optionally, the second electrode connection wire and the conducting wire connected to the negative terminal are both disposed inside the tube wall of the lens tube, or are both disposed on the outer surface of the lens tube, or are both disposed on the inner surface of the lens tube. In this way, the second electrode connection wire and the conducting wire connected to the negative terminal may be formed in a same step. This helps simplify the manufacturing process of the lens.

Optionally, a part that is of the antistatic structure and that is connected to the second electrode connection wire is located between two ends that are of the two conducting wires and that are connected to the detection line. In this way, a distance between the part that is of the antistatic structure and that is connected to the second electrode connection wire and an end that is connected to the conducting wire of the negative terminal and that is connected to the detection line is relatively short. This helps shorten a length of the second electrode connection wire.

With reference to the first aspect, in a possible design, a material of the lens tube is metal direct molding plastic, and the antistatic structure is a conductive structure manufactured by using a metal direct molding process; or the antistatic structure is a conductive coating manufactured by using an electroplating process. A manner of manufacturing the antistatic structure by using the metal direct molding process is simple, and no additional conductive material needs to be prepared for forming the antistatic structure.

With reference to the first aspect, in a possible design, resistivity of the antistatic structure is less than resistivity of the conductive layer, so as to effectively attract and guide static electricity that is to enter the conductive layer.

Optionally, a material of the antistatic structure is metal. The metal has a low resistivity, and can quickly attract and conduct static electricity. This helps improve an antistatic capability of the antistatic structure.

With reference to the first aspect in a possible design, an edge that is of an orthographic projection of at least a part of tire antistatic structure on a plane defined by the optical element and that is close to the optical element coincides with an edge that is close to the optical element and that is in the top surface covered by the part of the antistatic structure, to minimize, as much as possible, a spacing between the optical element and the orthographic projection of the antistatic structure on the plane defined by the optical element, and improve an antistatic capability of the antistatic electrode to protect the conductive layer attach to the optical element.

With reference to the first aspect, in the foregoing possible designs and optional schemes of the foregoing possible designs, the lens further includes a protective layer covering the antistatic structure, to prevent the antistatic structure from being corroded by factors such as water vapor and oxygen in an external environment, and protect the antistatic structure.

According to a second aspect of the present invention, an active light emitting module is provided. The active light emitting module includes a bottom substrate and a lens mounted on the bottom substrate. The lens is the lens according to any one of the foregoing. A ground terminal is disposed on the bottom substrate, and an electrostatic conducting wire of the lens is electrically connected to the ground terminal. In this way, an antistatic structure of the lens can guide at least a part of static electricity of a conductive layer that is to enter the lens and that is attached to an optical element to the ground terminal through an electrostatic conducting wire, reducing a risk that the conductive layer is damaged by the static electricity, and helping prolong a service life of the active light emitting module.

With reference to the second aspect, in a possible design, a positive terminal and a negative terminal are disposed on the bottom substrate, and the negative terminal is electrically connected to the ground terminal, or the negative terminal and the ground terminal are configured as a same terminal. The conductive layer of the optical element of the lens includes a detection line, two ends of the detection line are electrically connected to the positive terminal and the negative terminal respectively through two conducting wires, and the electrostatic conducting wire and the conducting wire connected to the negative terminal are configured as a same conductive line. In this way, a structure and a manufacturing process of the lens is simplified.

Optionally, a lens tube of the lens and the bottom substrate form a receptacle, and both the positive terminal and the negative terminal are located inside or outside the receptacle.

According to a third aspect of the present invention, a terminal is provided. The terminal includes the active light emitting module according to any one of the foregoing. Because a conductive layer in the active light emitting module has a relatively low risk of being damaged by static electricity and a relatively long service life, the terminal including the active light emitting module has relatively high reliability.

DESCRIPTION OF EMBODIMENTS

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features, in the descriptions of the embodiments of the present invention, unless stated otherwise, "a plurality of" means two or more than two.

Embodiments of the present invention provide a lens and an active light emitting module. The lens and the active light emitting module may be applied to any terminal such as a mobile phone, a wearable device, an AR (augmented reality) or a VR (virtual reality) device, a tablet computer; a notebook computer, a UMPC (ultra-mobile personal computer), a netbook, or a PDA (personal digital assistant). This is not limited in the embodiments of the present invention.

Figure 1:
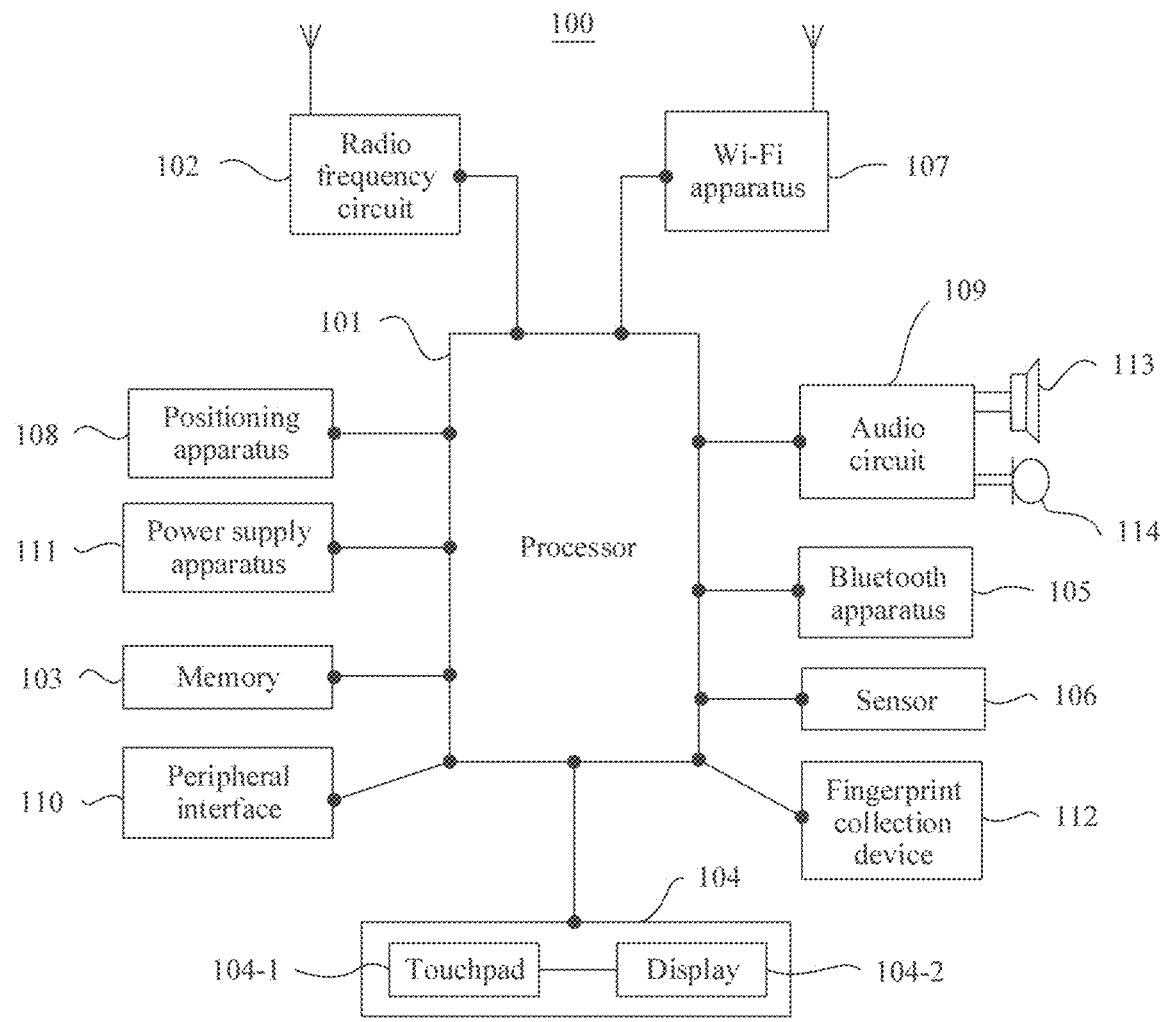
FIG. 1 is a schematic structural diagram of a terminal according to an embodiment of the present invention.
Figure 2:
FIG. 2 is a schematic diagram of an application scenario of an active light emitting module according to an embodiment of the present invention.

As shown in FIG. 1 and FIG. 2, the terminal in the embodiments of the present invention may be a mobile phone 100. The mobile phone 100 is used as an example below to describe the embodiments in detail.

As shown in FIG. 1, the mobile phone 100 may specifically include components such as a processor 101, a radio frequency (RT) circuit 102, a memory 103, a touchscreen 104, a Bluetooth apparatus 105, one or more sensors 106, a Wi-Fi apparatus 107, a positioning apparatus 108, an audio circuit 109, a peripheral interlace 110, and a power supply apparatus 111. These components may perform communication by using one or more communications buses or signal cables (not shown in FIG. 2). A person skilled in the art may understand that a hardware structure shown in FIG. 2 does not constitute a limitation on the mobile phone, and the mobile phone 100 may include more or fewer components than those shown in the figure, or may combine some components, or may have different component arrangements.

The following describes in detail the components of the mobile phone 100 with reference to FIG. 1.

The processor 101 is a control center of the mobile phone 100. The processor 101 is connected to all pasts of the mobile phone 100 through various interfaces and lines, and performs various functions of the mobile phone 100 and processes data by running or executing an application (App for short) stored in the memory 103 and invoking data stored in the memory 103. In some embodiments, the processor 101 may include one or more processing units. For example, the processor 101 may be a Kirin 960 chip manufactured by Huawei Technologies Co., Ltd.

The radio frequency circuit 102 may be configured to receive and send a radio signal in an information receiving/sending process or a call process. Particularly, the radio frequency circuit 102 may receive downlink data from a base station, and then send the downlink data to the processor 101 for processing. In addition, the radio frequency circuit 202 sends related uplink data to the base station. The radio frequency circuit usually includes but is not limited to an antenna, at least one amplifier, a transceiver, a coupler, a low noise amplifier, a duplexer, and the like. In addition, the radio frequency circuit 102 may further communicate with another device through wireless communication. The wireless communication may use any communication standard or protocol, including but not limited to a global system for mobile communications, a general packet radio service, code division multiple access, wideband code division multiple access, long term evolution, an e-mail, an SMS message service, and the like.

The memory 103 is configured to store the application and the data. The processor 101 performs the various functions of the mobile phone 100 and data processing by running the application and the data that are stored in the memory 103. The memory 103 mainly includes a program storage area and a data storage area. The program storage area may store an operating system and an application required by at least one function (such as a sound playback function or an image playback function). The data storage area may store data (such as audio data or a phone book) created based on use of the mobile phone 100. In addition, the memory 103 may include a high-speed random access memory, and may further include a non-volatile memory such as a magnetic disk storage device, a flash memory device, or another volatile solid-state storage device. The memory 103 may store various operating systems such as an iOS operating system developed by Apple and an Android operating system developed by Google.

The touchscreen 104 may include a touchpad 104-1 and a display 104-2. The touchpad 104-1 may collect a touch event performed by a user of the mobile phone 100 on or near the touchpad 104-1 (for example, an operation performed by the user on the touchpad 104-1 or near the touchpad 104-1 by using any proper object such as a finger or a stylus), and send collected touch information to another component such as the processor 101.

The touch event performed by the user near the touchpad 104-1 may be referred to as a floating touch. The floating touch may mean that the user does not need to directly touch the touchpad for selecting, moving, or dragging an object (for example, an icon), and the user only needs to be near the terminal to perform a desired function. In an application scenario of the floating touch, terms such as "touch" and "contact" do not implicitly mean to directly touch the touchscreen, but to be near or close to the touchscreen.

Specifically, two types of capacitance sensors: a mutual-capacitance sensor and a self-capacitance sensor may be disposed in the touchpad 104-1. The two types of capacitance sensors may be arranged in an array on the touchpad 104-1 alternately. The mutual-capacitance sensor is configured to implement a normal conventional multi-point touch, in other words, detect a gesture generated when the user touches the touchpad 104-1. The sell-capacitance sensor may generate a signal stronger than that of the mutual-capacitance sensor, to detect finger induction farther away from the touchpad 104-1. Therefore, when a finger of the user hovers over a screen, because the signal generated by the self-capacitance sensor is stronger than the signal generated by the mutual-capacitance sensor, the mobile phone 100 can detect a gesture of the user above the screen, for example, in a position 20 mm above the touchpad 104-1.

Optionally, the touchpad 104-1 that can support the floating touch may be implemented in a capacitive type, an infrared light sensing type, an ultrasonic wave type, or the like. In addition, the touchpad 104-1 may be implemented in a plurality of types such as a resistive type, a capacitive type, an infrared type, and a surface acoustic wave type. The display 104-2 may be configured to display information entered by the user, information provided for the user, and various menus of the mobile phone 100. The display 104-2 may be configured in a form of a liquid crystal display, an organic light emitting diode, or the like. The touchpad 104-1 may cover the display 104-2. After detecting the touch event on or near the touchpad 104-1, the touchpad 104-1 transfers the touch event to the processor 101 to determine a type of the touch event. Then, the processor 101 may provide corresponding visual output on the display 104-2 based on the type of the touch event.

Although in FIG. 1, the touchpad 104-1 and the display 104-2 are used as two independent components to implement input and output functions of the mobile phone 100, in some embodiments, the touchpad 104-1 and the display 104-2 may be integrated to implement the input and output functions of the mobile phone 100.

It may be understood that the touchscreen 104 is formed by stacking layers of materials. In the embodiments of the present invention, only the touchpad (layer) and the display (layer) are displayed, and another layer is not recorded in the embodiments of the present invention. In addition, in some other embodiments of the present invention, the touchpad 104-1 may cover the display 104-2, and a size of the touchpad 104-1 is greater than a size of the display 104-2, so that the display 104-2 is entirely covered by the touchpad 104-1. Alternatively; the touchpad 104-1 may be configured on a front side of the mobile phone 100 in a full panel form, in other words, any touch performed by the user on the front side of the mobile phone 100 can be sensed by the mobile phone. In this way, full touch experience on the from side of the mobile phone can be implemented. In some other embodiments, the touchpad 104-1 is configured on the front side of the mobile phone 100 in the full panel form, and the display 104-2 may also be configured on the front side of the mobile phone 100 in the full panel form. In this way, a bezel-less structure can be implemented on the front side of the mobile phone.

In the embodiments of the present invention, the mobile phone 100 may further have a fingerprint recognition function. For example, a fingerprint reader 112 may be disposed on a rear side (for example, below a rear-facing camera) of the mobile phone 100, or the fingerprint reader 112 may be disposed on a front side (for example, below the touchscreen 104) of the mobile phone 100. For another example, a fingerprint collection device 112 may be configured in the touchscreen 104 to implement the fingerprint recognition function. In other words, the fingerprint collection device 112 may be integrated into the touchscreen 104 to implement the fingerprint recognition function of the mobile phone 100. In this ease, the fingerprint collection device 112 is configured in the touchscreen 104, and may be a part of the touchscreen 104, or may be configured in the touchscreen 104 in another manner. In addition, the fingerprint collection device 112 may be further implemented as a full-panel fingerprint collection device. Therefore, the touchscreen 104 may be considered as a panel on which fingerprint recognition can be performed at any position. The fingerprint collection device 112 may send a collected fingerprint to the processor 101, so that the processor 101 processes the fingerprint (for example, fingerprint verification). A main component of the fingerprint collection device 112 in the embodiments of the present invention is a fingerprint sensor. The fingerprint sensor may use any type of sensing technology, including but not limited to an optical sensing technology a capacitive sensing technology, a piezoelectric sensing technology, an ultrasonic sensing technology or the like.

The mobile phone 100 may further include the Bluetooth apparatus 105, configured to exchange data between the mobile phone 100 and another short-distance terminal (for example, a mobile phone or a smartwatch). The Bluetooth apparatus 105 in the embodiments of the present invention may be an integrated circuit, a Bluetooth chip, or the like.

The mobile phone 100 may further include at least one type of sensor 106, such as a light sensor, a motion sensor, or another sensor. Specifically, the light sensor may include an ambient fight sensor and a proximity sensor. The ambient light sensor may adjust, luminance of the display of the touchscreen 104 based on intensity of ambient light. The proximity sensor may power off the display when the mobile phone 100 moves to an ear. As a type of the motion sensor, an accelerometer sensor may detect values of acceleration in all directions (usually on three axes), may detect a value and a direction of gravity when the mobile phone is still. The accelerometer sensor may be used in an application for identifying a mobile phone posture (such as switching between a landscape mode and a portrait mode, a related game, or magnetometer posture calibration), a function related to vibration recognition (such as a pedometer or a knock), or the like. Other sensors such as a gyroscope, a barometer, a hygrometer, a thermometer, and an infrared sensor may be further configured in the mobile phone 100. Details are not described herein.

The Wi-Fi apparatus 107 is configured to provide the mobile phone 100 with network access that complies with a Wi-Fi-related standard protocol. The mobile phone 100 may gain access to a Wi-Fi access point through the Wi-Fi apparatus 107, to help the user to receive and semi an email browse a web page, gain access to a streaming media, and the like. The Wi-Fi apparatus 107 provides wireless broadband internet access tor the user. In some other embodiments, the Wi-Fi apparatus 107 may alternatively be used as a Wi-Fi wireless access point, and may provide Wi-Fi network access for another terminal.

The positioning apparatus 108 is configured to provide a geographical location for the mobile phone 100. It may be understood that the positioning apparatus 108 may be specifically a receiver of a positioning system such as a global positioning system (GPS), a BeiDou navigation satellite system, or a Russian GLONASS. Alter receiving the geographical location sent by the positioning system, the positioning apparatus 108 sends the information to the processor 101 for processing, or sends the information to the memory 103 for storage, in some other embodiments, the positioning apparatus 108 may be further a receiver of an assisted global positioning system (AGPS). The AGPS system serves as an assisted server to assist the positioning apparatus 108 in completing ranging and positioning services. In this case, the assisted positioning server communicates, through a wireless communications network, with the positioning apparatus 108 (namely, a GPS receiver) of a terminal such as the mobile phone 100 and provides positioning assistance, in some other embodiments, the positioning apparatus 108 may alternatively be a positioning technology based on a Wi-Fi access point. Each Wi-Fi access point has a globally unique MAC address, and a terminal can scan and collect a broadcast signal of a surrounding Wi-Fi access point when Wi-Fi is enabled. Therefore, a MAC address that is broadcast by the Wi-Fi access point can be obtained. The terminal sends such data (for example, the MAC address) that can identify the Wi-Fi access point to a location server through the wireless communications network. The location server retrieves a geographical location of each Wi-Fi access point, obtains a geographical location of the terminal through calculation with reference to strength of the Wi-Fi broadcast signal, and sends the geographical location of the terminal to the positioning apparatus 108 of the terminal.

The audio circuit 109, a speaker 113, and a microphone 114 may provide an audio interface between the user and the mobile phone 100. The audio circuit 109 may convert received audio data into an electrical signal and then transmit the electrical signal to the speaker 113, and the speaker 113 converts the electrical signal into a sound signal for output, in addition, the microphone 114 converts a collected sound signal into an electrical signal, and the audio circuit 109 receives the electrical signal and converts the electrical signal into audio data, and then outputs the audio data to the RF circuit 102 to send the audio data to, for example, another mobile phone, or outputs the audio data to the memory 103 for further processing.

The peripheral interface 110 is configured to provide various interfaces for an external input/output device (for example, a keyboard, a mouse, an external display, an external memory, or a subscriber identification module card). For example, the peripheral interface 710 is connected to the mouse through a universal serial bus (USB) interface, and the peripheral interface 710 is connected, through a metal contact on a card slot of the subscriber identification module card, to the subscriber identification module (SIM) card provided by a telecom operator. The peripheral interface 110 may be configured to couple the external input/output peripheral device to the processor 101 and the memory 103.

The mobile phone 100 may further include the power supply apparatus ill (for example, a battery and a power management chip) that supplies power to the components. The battery may be logically connected to the processor 101 by using the power management chip, to implement functions such as charging management, discharging management, and power consumption management by using the power supply apparatus ill.

Although not shown in FIG. 1, the mobile phone 100 may further include a camera (a front-facing camera and/or a rear-facing camera), a flash, a micro projection apparatus, a near field communication (NFC) apparatus, and the like. Details are not described herein.

A 3D sensing module may be integrated into the terminal such as the mobile phone 100, so that the terminal implements a 3D sensing function. A common digital camera can obtain only a flat color image without image depth information. This means that when seeing a photo, the user knows only a width and a height of a face of a person, hut does not know a three-dimensional structure of the face of the person, for example, a height of the nose bridge relative to cheeks, and a depth of eye sockets relative to the cheeks. The image depth information is obtained through 3D sensing, so that the terminal implements facial recognition or gesture control. For example, the mobile phone is unlocked by recognizing a facial feature of the user, or when the user makes a swipe gesture in front of the mobile phone, the terminal may be controlled to delete an email.

The following two technologies are mainly used to implement 3D sensing.

(1) TOP (Time Of Plight, time of flight) technology; A high-power laser (for example, a VCSEL (Vertical-Cavity Surface-Emitting Laser, single-point vertical cavity surface emitting laser)) is used to emit infrared laser light to a surface of an object, the laser light is reflected through the surface of the object, and the reflected laser light is captured by an infrared image sensor. Because a light speed of the laser light is known, the infrared image sensor can be used to measure times of reflecting the laser light at different depth locations on the surface of the object, and obtain distances (depths) of the different locations on the surface of the object through calculation.

(2) Structured light (Structured Light) technology; A laser is used to produce different light patterns (light with a specific structure feature is referred to as the structured light). After being projected onto a surface of an object, the light patterns are reflected at different depth locations on the surface of the object, and the reflected light patterns are distorted. For example, light of a linear stripe that is emitted by the laser is projected onto a finger. Because a surface of the finger is in a three-dimensional arc shape, the linear stripe reflected by the arc-shaped surface of the finger becomes an arc-shaped stripe. After the arc-shaped stripe is captured by an infrared image sensor, the terminal may reversely deduce a three-dimensional structure of the finger based on the reflected arc-shaped stripe.

As shown in FIG. 2, in an example of the mobile phone 100, a TOF or structured light 3D sensing module may be disposed on the top of the mobile phone 100, for example, at a "notch" location (namely, a region AA shown in FIG. 2) of the mobile phone 100.

Figure 3:
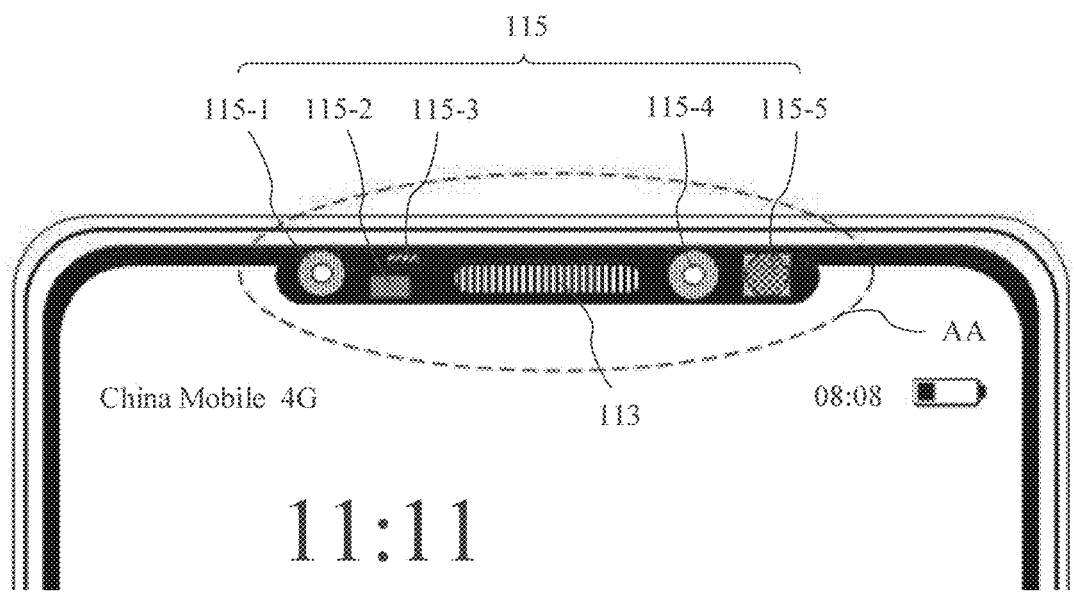
FIG. 3 is a partially enlarged diagram of FIG. 2.

As shown in FIG. 3, for example, a structured light 3D sensing module 115 is integrated into the mobile phone 100. The structured light 3D sensing module 115 is arranged in the mobile phone 100 in the following form. The structured light 3D sensing module 115 includes modules such as an infrared camera 115-1, a flood illuminator 115-2, a short-distance sensor 115-3, an infrared image sensor 115-4, and a dot projector 115-5. A low-power laser (for example, a VCSEL) and a lens including a component such as a diffuser are disposed in the flood illuminator 115-2. A high-power laser (for example, a VCSEL) and a lens including a component such as a diffractive optical element are disposed in the dot projector 115-5.

For example, a process in which the structured light 3D sensing module 115 performs facial recognition is as follows: When an object (for example, a face) approaches the mobile phone 100, the short-distance sensor 115-3 senses that the object approaches the mobile phone 100, so that the short-distance sensor 115-3 sends, to the processor 101 of the mobile phone 100, a signal indicating that the object approaches. The processor 101 receives the signal indicating that the object approaches, and controls the flood illuminator 115-2 to be started, and the low-power laser in the flood illuminator 115-2 projects infrared laser light onto a surface of the object. The surface of the object reflects the infrared laser light projected by the flood illuminator 115-2, and the infrared camera 115-1 captures the infrared laser light reflected by the surface of the object, to obtain image information of the surface of the object, and then uploads the obtained image information to the processor 101. The processor 101 determines, based on the uploaded image information, whether the object approaching the mobile phone 100 is the face.

When determining that the object approaching the mobile phone 100 is the face, the processor 101 controls the dot projector 115-5 to be started. The high-power laser in the dot projector 115-5 emits infrared laser light, and an element such as the diffractive optical element in the dot projector 115-5 performs an operation, on the infrared laser light to form many (for example, approximately 30,000) structured light spots, and projects the structured light spots onto a surface of the face. An array formed by the structured light spots is reflected by different locations on the surface of the face. The infrared camera 115-1 captures the structured light spots reflected by the surface of the face, to obtain depth information of the different locations on the surface of the face, and then uploads the obtained depth information to the processor 101. The processor f 01 compares and calculates the uploaded depth information and user's facial feature data that is pre-stored in the mobile phone 100, and identifies whether the face approaching the mobile phone 100 is the face of the user of the mobile phone 100, and if the face approaching the mobile phone 100 is the face of the user of the mobile phone 100, the processor 101 controls the mobile phone 100 to the unlocked; or If the face approaching the mobile phone 100 is not the face of the user of the mobile phone 100, the processor 101 controls the mobile phone 100 to remain in a locked state.

The TOP or structured light 3D sensing module includes a module that can emit laser light, for example, a module that is in the TOP 3D sensing module and that includes a high-power laser, or the dot projector 115-5 and the flood illuminator 115-2 that are in the structured light 3D sensing module 115. This type of module is referred to as an active light emitting module below.

Figure 4A:
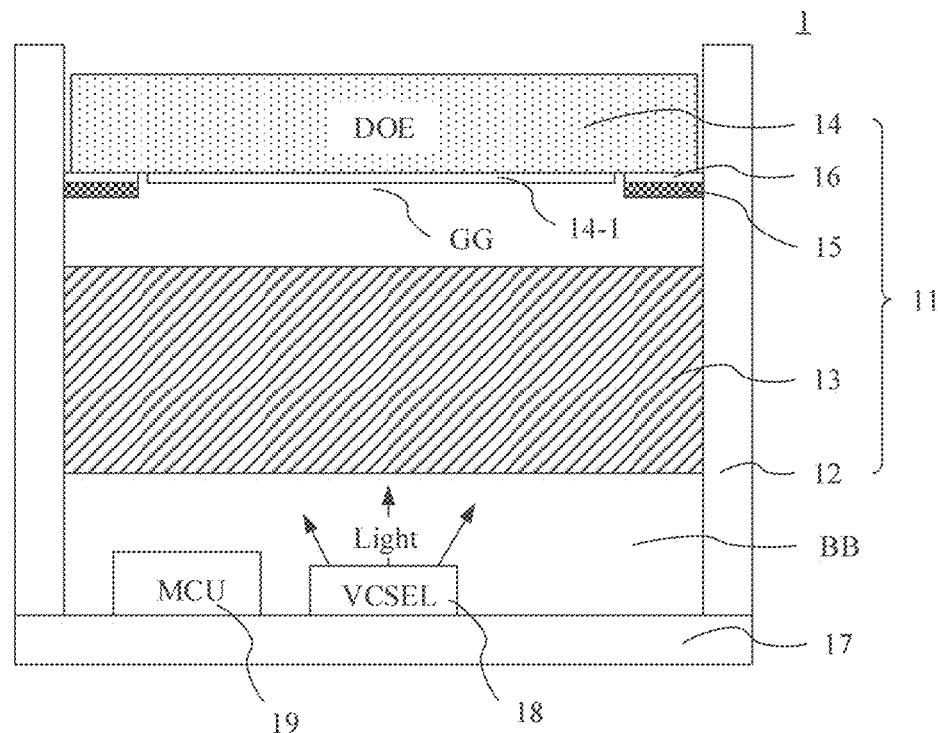
FIG. 4a is a schematic diagram of a typical structure of an active light emitting module.

FIG. 4a shows a typical structure of an active light emitting module 1. The active light emitting module 1 mainly includes a lens 11, a bottom substrate 17, a laser 18, and a microprocessor (MCU, Microcontroller Unit) 19. The lens if includes a lens tube 12, a lens component 13, and an optical dement 14. The lens tube 12 is mounted on one side of the bottom substrate 17, and forms a receptacle BB with the bottom substrate 17. In addition, referring to FIG. 4b, a holding structure 15 is disposed at an end that is inside the lens tube 12 and that is away from the bottom substrate 17. The holding structure 15 is a ring structure, and is disposed on an inner surface of the lens tube 12, to form a clear aperture GG. The laser IS, the microprocessor 19, the lens component 13, and the optical element 14 are all mounted in the receptacle BB. The laser 18 and the microprocessor 19 are mounted on the bottom substrate 17. The lens component 13 is mounted between the holding structure 15 and the bottom substrate 17. An edge of the optical element 14 is fastened, by using an adhesive 16, to a surface that is of the holding structure 15 and that is opposite to the laser 18. In a possible design, a microstructure layer 14-1 is disposed on a surface that is of the optical element 14 and that faces the laser 18, and the microstructure layer 14-1 includes a microstructure such as a diffraction grating or a dot, so that the optical element 14 has a specific function.

In the active light emitting module 1, a type of the laser 18 may be specifically a YCSEL, a DFB (Distributed Feedback Laser, distributed feedback laser), an edge-emitting laser; or the like. The lens component 13 includes at least one optical lens. When the lens component 13 includes a plurality of optical lenses, the lens component 13 is formed by superimposing the plurality of optical lenses. The optical lens may be, for example, a convex lens. The lens component 13 is configured to collimate and converge laser light emitted by the laser 18. A type of the optical element 14 may be specifically a diffuser, a diffractive optical element, a Fresnel lens, or the like. For example, if the active light emitting module 1 is a module that is in a TOF 3D sensing module and that includes a high-power laser, or is a flood illuminator in a structured light 3D sensing module, the optical element 14 may be specifically a diffuser, and the microstructure layer 14-1 of the optical element 14 includes a diffusion, microstructure such as the dot. If the active light emitting module 1 is a dot projector in the structured light 3D sensing module, the optical element 14 may be specifically a diffractive optical element (DOE), and the microstructure layer 14-1 of the optical element 14 includes a diffraction grating microstructure.

The active light emitting module 1 may be mounted in a terminal such as the mobile phone 100, a side of the laser 18 (namely, a light emitting side) in the active light emitting module 1 is close to inside of the terminal, and a side of the optical element 14 (namely, a light output side) feces outside of the terminal, to project laser light outward. In the active light emitting module 1, the microprocessor 19 is connected to a processor integrated on a mainboard of the terminal. For example, if the active light emitting module 1 is applied to the mobile phone 100, the microprocessor 19 of the active light emitting module 1 is connected to the processor 101 of the mobile phone 100. The microprocessor 19 is connected to the laser 18, and controls the laser 18 to transmit laser light. The laser light passes through the lens component 13, passes through the clear aperture G0, and then is emitted out of the active light emitting module 1 through the optical element 14.

In an actual use process of the terminal, as a use time is prolonged, reliability of the active light emitting module 1 in the terminal is reduced due to aging, and the optical element 14 in the active light emitting module 1 may be damaged or fall off due to water penetration, erosion, or the like. In this case, the laser light emitted by the laser 18 in the active light emitting module 1 leak out and is directed onto a human eye. Consequently; the human eye may be damaged. If the laser 18 in the active light emitting module 1 emits high-power laser light, damage to the human eye is more serious.

Therefore, a damage or fall-off status of the optical element 14 in the active light emitting module 1 needs to be monitored, so that when the optical element 14 is damaged or falls off a response measure such as turning off the laser 18 is taken in a timely manner, to avoid leakage of the laser light emitted by the laser 18. In a related technology, a conductive layer is disposed on a surface of the optical element 14 to monitor the damage or fall-off status of the optical element 14. For details, refer to FIG. 5a to FIG. 5c. A conductive layer 20 is disposed on the surface that is of the optical element 14 and that is opposite to the laser 18. The conductive layer 20 includes a detection line 20-1. A material of the detection line 20-1 is a transparent conductive material such as GO (indium tin oxide). IZO (indium zinc oxide), IGZO (indium gallium zinc oxide), or ITZO (indium tin zinc oxide). Two ends of the detection line 20-1 are connected to the microprocessor 19 through conducting wires 21. The detection line 20-1, the conducting wires 21, and the microprocessor 19 form a loop, and the loop is referred to as a monitoring circuit below.

Figure 5A:
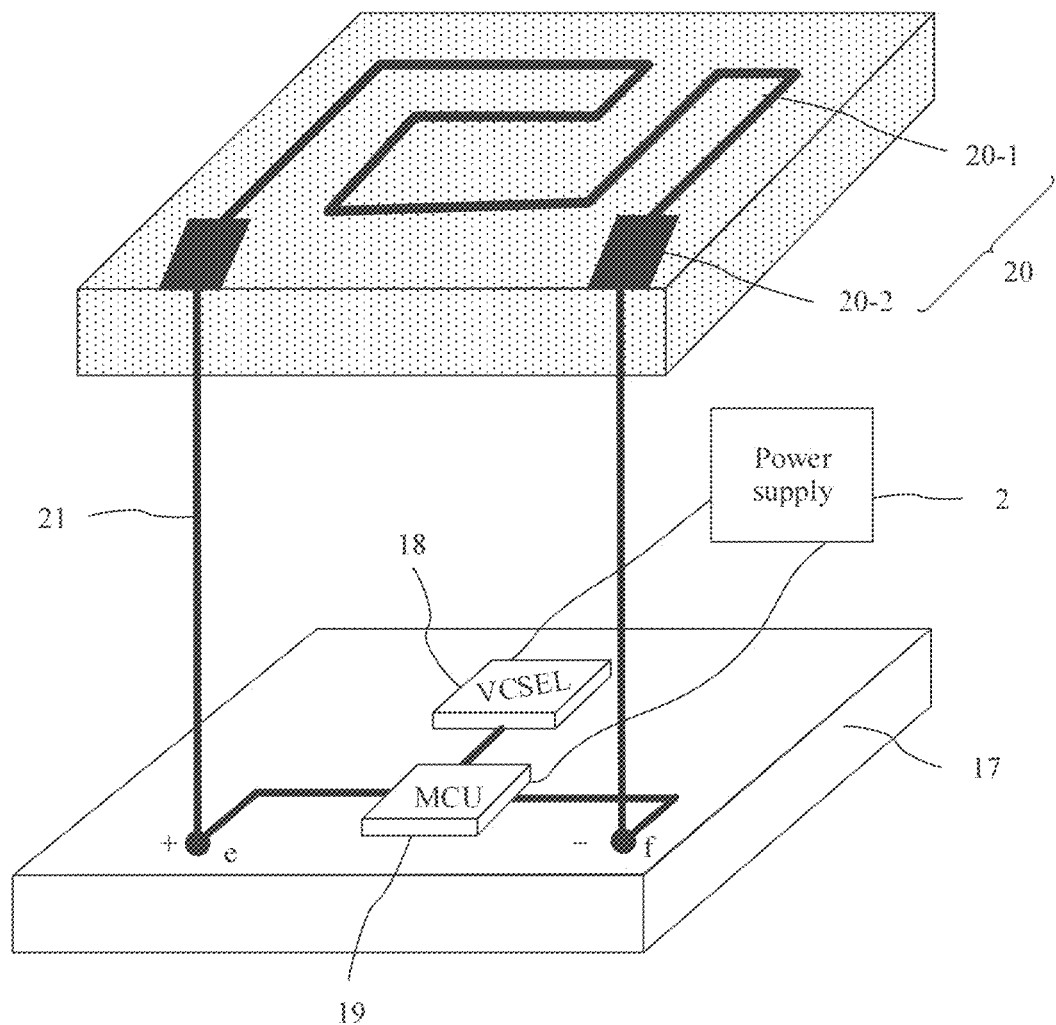
FIG. 5a is a schematic diagram 1 of an application scenario of a lens according to an embodiment of the present invention.
Figure 5B:
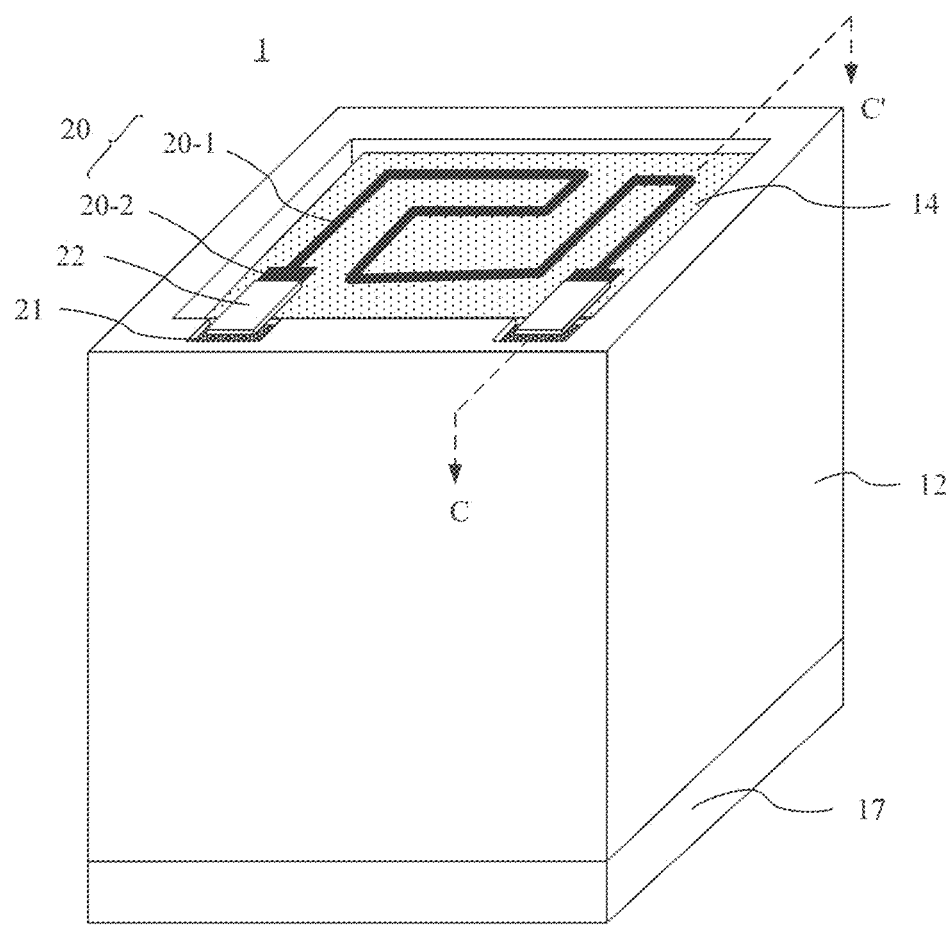
FIG. 5b is a schematic diagram 2 of an application scenario of a lens according to an embodiment of the present invention.
Figure 5C:
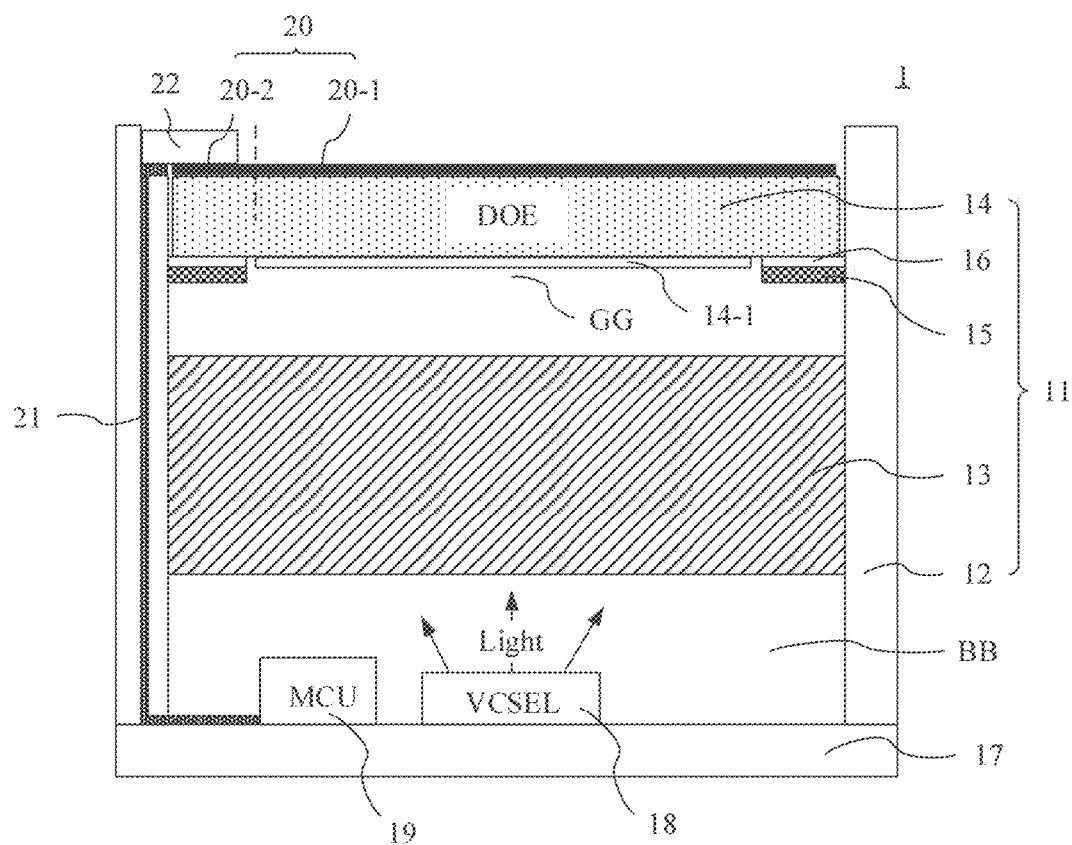
FIG. 5c is a sectional view of FIG. 5b along a dashed line CC'.

Still referring to FIG. 5a to FIG. 5c, the conductive layer 20 further includes conductive pads 20-2 that are respectively disposed on the two ends of the detection line 20-1. A conductive electrode 22 is disposed above the conductive pad 20-2 and an end that is of the conducting wire 21 and that is connected to the detection line 20-1, so that the detection line 20-1 is electrically connected to the conducting wire 21 through the conductive pad 20-2 and the conductive electrode 22.

In the foregoing monitoring circuit the microprocessor 19 provides a voltage for an entire monitoring circuit, and monitors a resistance value of the detection line 20-1 or a voltage value at two ends of the detection line 20-1 in real time. When the resistance value of the detection line 20-1 or the voltage value at both ends of the detection line 20-1 changes abnormally, for example, the resistance value of the detection line 20-1 exceeds a set resistance threshold range, or the voltage value at both ends of the detection line 20-1 exceeds a set voltage threshold range, it indicates that the monitoring circuit is open-circuited. The detection line 20-1 may be broken, or an open circuit may occur at a joint between the detection line 20-1 and the conducting wire 21. A reason why the detection line 20-1 is broken may be that the optical element 14 to which the detection line 20-1 is attached is damaged, and a reason why the open circuit occurs at the joint between the detection line 20-1 and the conducting wire 21 may be that the optical element 14 to which the detection line 20-1 is attached tails off. Therefore, when the microprocessor 19 detects that the resistance value of the detection line 20-1 exceeds the set resistance threshold range, or that the voltage value at both ends of the detection line 20-1 exceeds the set voltage threshold range, it may be determined that the optical element 14 is damaged or falls off. When determining that the optical element 14 is damaged or fails off, the microprocessor 19 controls a power supply 2 to stop supplying power to the laser 18, and the laser 18 is turned off thereby effectively preventing the laser light emitted by the laser 18 from leaking out and being directly onto the human eye, so that the damage to the human eye is avoided.

It should be noted that when the optical element 14 is damaged or falls off the detection line 20-1 is broken, or the joint between the detection line 20-1 and the conducting wire 21 is disconnected. Therefore, in this ease, the resistance value that is of the detection line 20-1 and that is monitored by the microprocessor 19 becomes very large or even infinite ($\infty$), or the voltage value at the two ends of the detection line 20-1 is close to or equal to a voltage value provided by the microprocessor 19 for the entire monitoring circuit.

The "set resistance threshold range" mentioned above may be set to a numerical range that fluctuates around a resistance value R obtained when the detection line 20-1 is not broken. For example, the "set resistance threshold range" may be set to be greater than or equal to 80% R and less than or equal to 120% R. For example, if the resistance value R obtained when the detection line 20-1 is not broken is 10 K$\Omega$, the "set resistance threshold range" may be set to be greater than or equal to 8 KG and leas than or equal to 12 KG.

The "set voltage threshold range" mentioned above may be set to a numerical range that fluctuates around a voltage value U that is shared by the detection line 20-1 in the entire monitoring circuit and that is obtained when the detection line 20-1 is not broken. For example, the "set voltage threshold range" may be set to be greater than or equal to 80% U and less than or equal to 120% U. For example, if the voltage value U that is shared by the detection line 20-1 in the entire monitoring circuit and that is obtained when the detection line 20-1 is not broken is 0.8 V, the "set voltage threshold range" may be set to be greater than or equal to 0.64 V and less than or equal to 0.96 V.

In the foregoing technical solution of monitoring the damage or fail-off status of the optical element 14 in real time, the conductive layer 20 needs to be disposed on the surface that is of the optical element 14 and that is opposite to the laser 18, that is, the conductive layer 20 is disposed on a surface that is of the optical element 14 and that faces outside of the module. In a process such as production of the optical element 14, assembly of the active light emitting module 1, and use of the terminal, static electricity is generated, in addition, the conductive layer 20 is disposed on the surface that is of the optical element 14 and that faces the outside of the module. Therefore, the static electricity easily enters the conductive layer 20. A voltage of the static electricity is very high, and the conductive layer 20 is damaged. Consequently, the detection line 20-1 in the conductive layer 20 is broken, and a monitoring function of the detection line 20-1 on the damage or fall-off status of the optical element 14 fads. In addition, the static electricity entering the conductive layer 20 may be conducted to the microprocessor 19 along the conducting wire 21 connected to the conductive layer 20, to damage the microprocessor 19.

For the foregoing problem, the embodiments of the present invention provide a lens. As shown in FIG. 6a to FIG. 6d and FIG. 8a to FIG. 8d, the lens 11 is applied to the active light emitting module 1, and the lens 11 includes the lens tube 12 and the optical element 14.

Figure 4B:
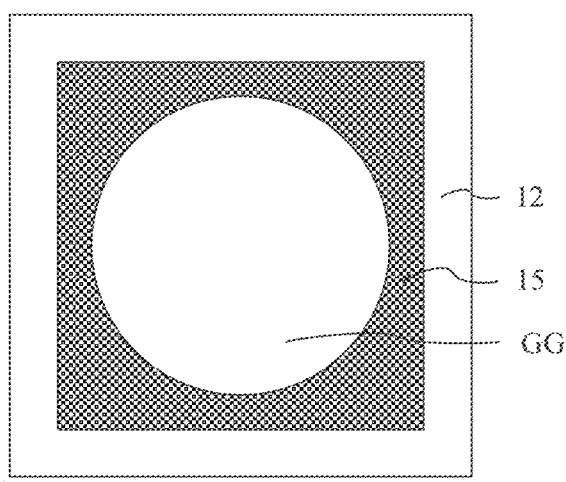
FIG. 4b is a top view of a lens tube in an active light emitting module.

The lens tube 12 has a top surface 12a and a bottom surface (not shown in the figure) opposite to the top surface 12a. The bottom surface is connected to the bottom substrate 17 of the active light emitting module 1. The top surface 12a is located on a side that is of the lens tube 12 and that is away from the bottom substrate 17. The top surface 12a is a frame-shaped surface. In some embodiments, the holding structure 15 is disposed on a side on which the top surface 12a is located in the lens tube 12. Referring to FIG. 4b, the holding structure 15 is a ring structure, and is disposed on the inner surface of the lens tube 12, to form the clear aperture GG.

The optical element 14 is mounted in the lens tube 12 and is located on a side on which the top surface 12a of the lens tube 12 is located. For example, the edge of the optical element 14 is fastened, by using the adhesive 16, to a surface that is of the holding structure 15 and that faces a side on which the top surface 12a of the lens tube 12 is located. The conductive layer 20 configured to monitor the damage or fall-off status of the optical element 14 is disposed on a surface that is of the optical element 14 and that faces the side on which the top surface 12a of the lens tube 12 is located.

Figure 6A:
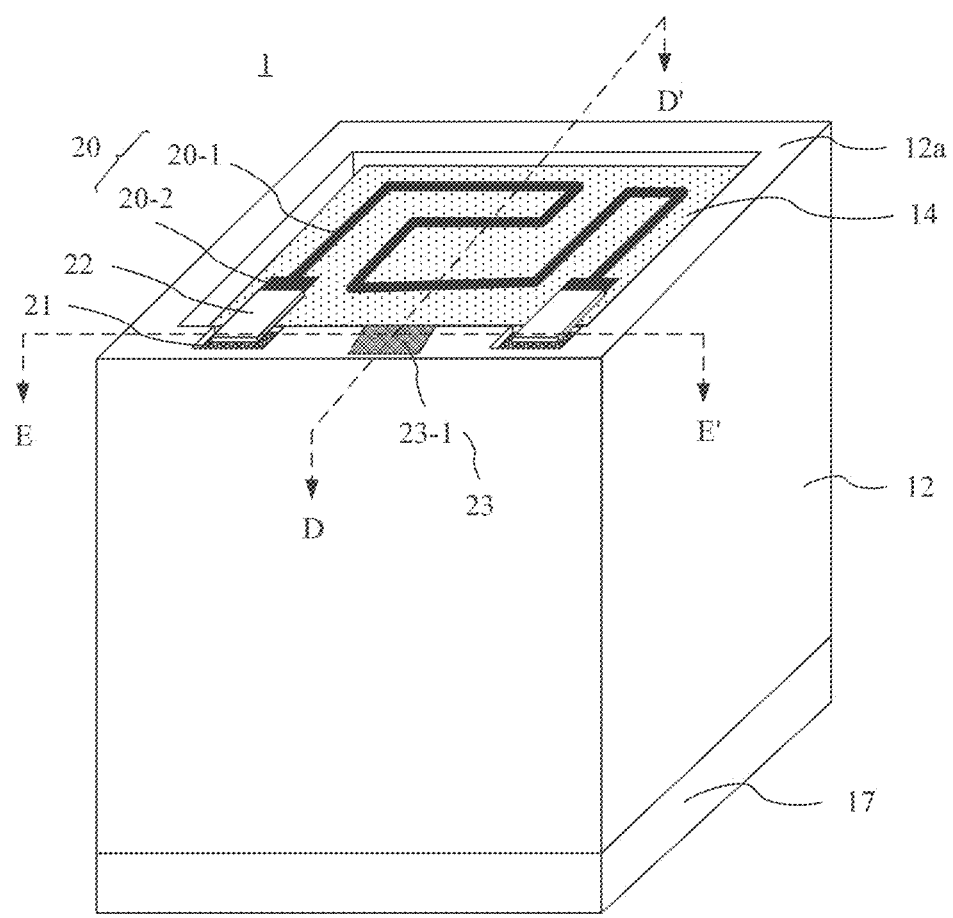
FIG. 6a is a three-dimensional diagram of a first type of active light emitting module according to an embodiment of the present invention.
Figure 6B:
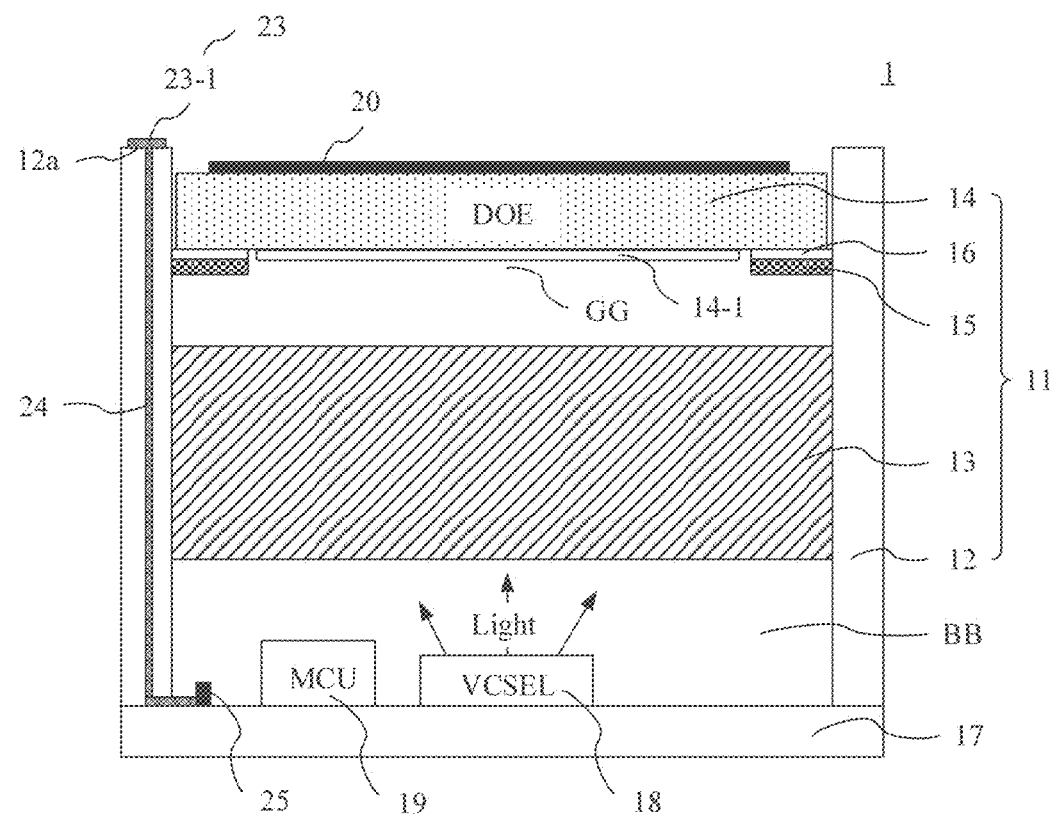
FIG. 6b is a sectional view of FIG. 6a along a dashed line DD'.
Figure 6C:
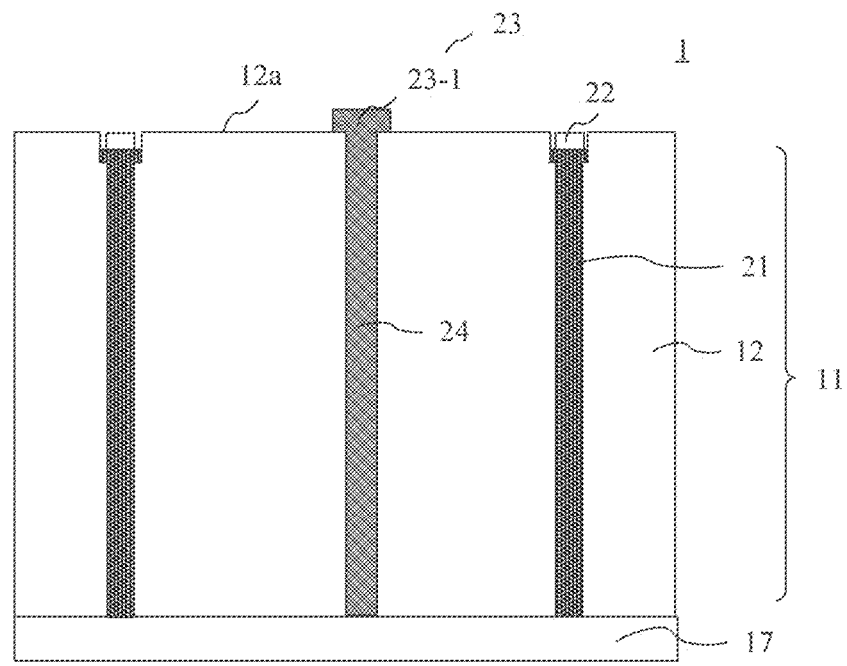
FIG. 6c is a sectional view of FIG. 6a along a dashed line EE'.

The lens 11 further includes an antistatic structure 23 disposed on the top surface 12a of the lens tube 12, and an electrostatic conducting wire 24 disposed inside a tube wall or on an inner surface or an outer surface of the lens tube 12. The antistatic structure 23 and the electrostatic conducting wire 24 are both electrically conductive, and the two are electrically connected. In addition, one end that is of the electrostatic conducting wire 24 and that is away from the antistatic structure 23 is grounded. For example, as shown in FIG. 6b, when the lens tube 12 is applied to the active light emitting module 1, a ground terminal 25 is disposed on the bottom substrate 17 of the active light emitting module 1, and the end that is of the electrostatic conducting wire 24 and that is away from the antistatic structure 23 may be connected to the ground terminal 25, so that the antistatic structure 23 and the electrostatic conducting wire 24 are grounded.

The antistatic structure 23 can guide static electricity passing through the antistatic structure 23 to the ground terminal through the electrostatic conducting wire 24, and the antistatic structure 23 can further attract static electricity near the antistatic structure 23, and then guide the attracted static electricity to the ground terminal through the electrostatic conducting wire 24. Because the frame-shaped top surface 12a of the lens tube 12 surrounds the conductive layer 20, and the antistatic structure 23 is disposed on the top surface 12a, the antistatic structure 23 is located in at least a past of an area around the conductive layer 20, so that the antistatic structure 23 can guide at least a part of static electricity close to the conductive layer 20 to the ground terminal 25, reducing an amount of static electricity entering the conductive layer 20, effectively reducing a risk that the conductive layer 20 is damaged by the static electricity, and therefore protecting (the conductive layer 20. Further, because the antistatic structure 23 reduces the amount of static electricity entering the conductive layer 20, a risk that the static electricity enters the microprocessor 19 along the conducting wire 21 connected to the conductive layer 20 and damages the microprocessor 19 is also reduced.

In a possible design, as shown in FIG. 6a to FIG. 6d and FIG. 7a to FIG. 7c, the antistatic structure 23 includes at least one antistatic electrode 23-1. For example, refer to FIG. 6a and FIG. 6d. The antistatic structure 23 includes one antistatic electrode 23-1. An orthographic projection of the antistatic electrode 23-1 on a plane defined by the optical element 14 is located in a surrounding area of fee optical dement 14 in which fee conductive layer 20 is located, so feat static electricity passing through the antistatic electrode 23-1 and around the antistatic electrode 23-1 can be guided to the ground terminal 25.

Figure 7A:
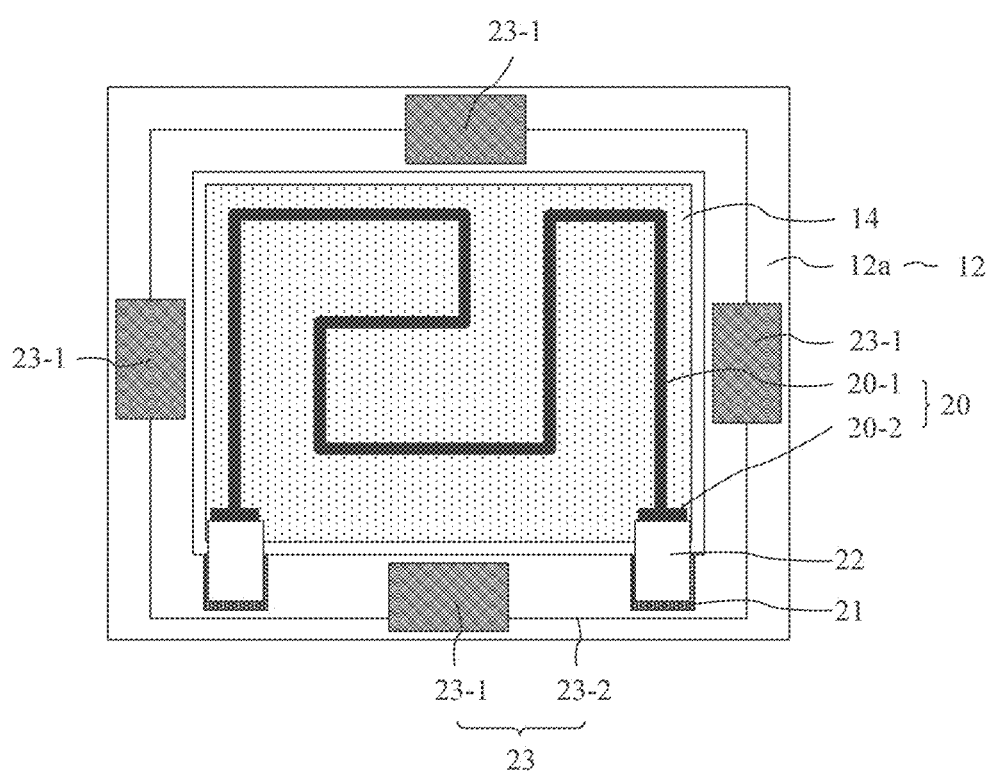
FIG. 7a is a top view of a second type of active light emitting module according to an embodiment of the present invention.
Figure 7B:
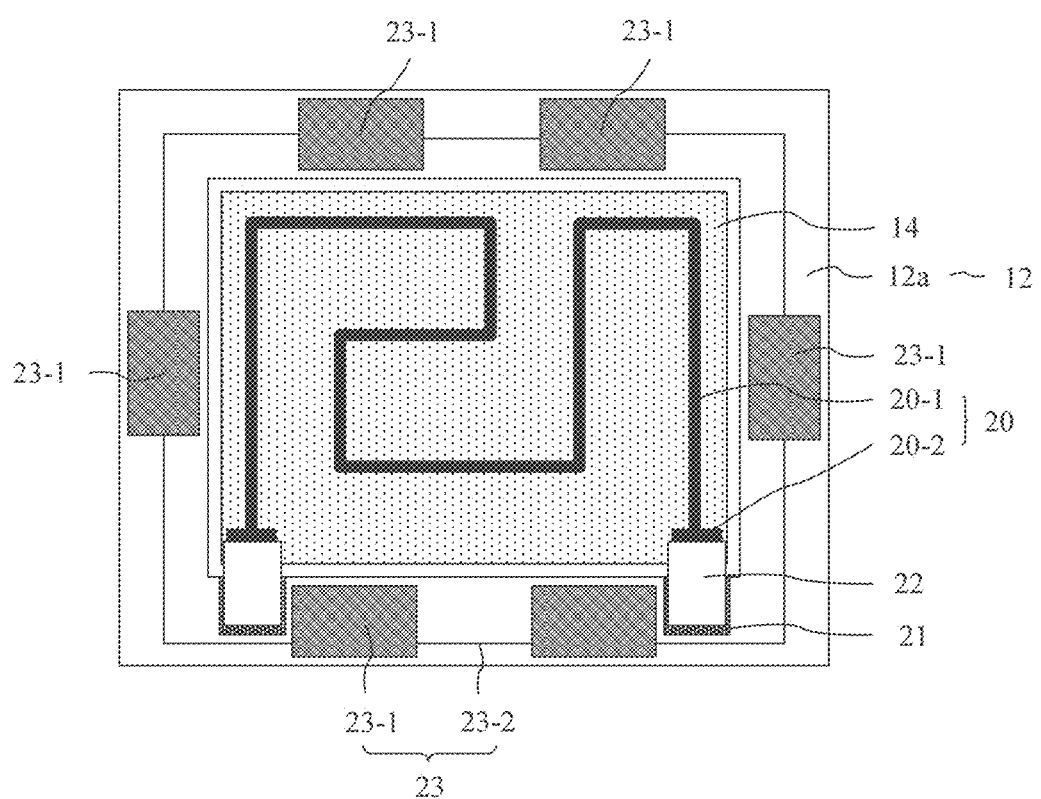
FIG. 7b is a top view of a third type of active light emitting module according to an embodiment of the present invention.
Figure 7C:
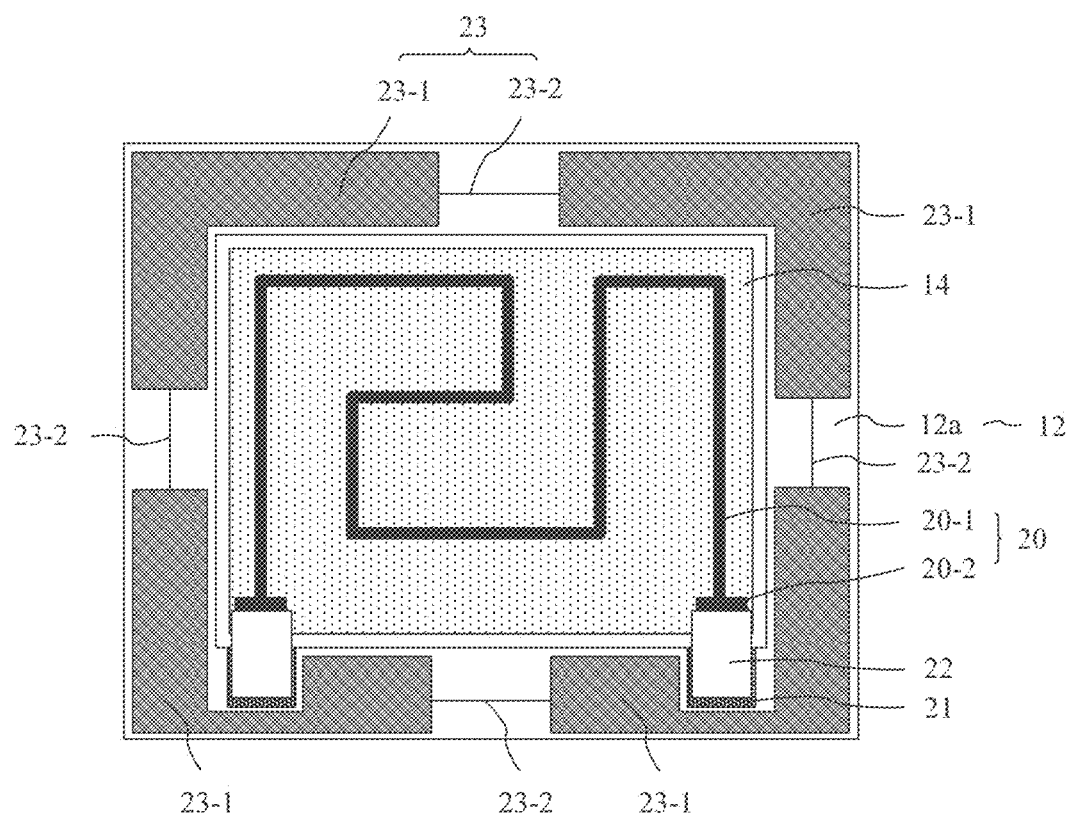
FIG. 7c is a top view of a fourth type of active light emitting module according to an embodiment of the present invention.

For example, refer to FIG. 7a to FIG. 7c. The antistatic structure 23 includes a plurality of antistatic electrodes 23-1, and the plurality of antistatic electrodes 23-1 are electrically connected to each other through a first electrode connection wire 23-2, so that the plurality of antistatic electrodes 23-1 may be grounded through one electrostatic conducting wire 24. The plurality of antistatic electrodes 23-1 are disposed at intervals on the top surface 12a of the lens tube 12. Further, the plurality of antistatic electrodes 23-1 are disposed at equal intervals around the optical demerit 14 in which the conductive layer 20 is located, so that an antistatic capability of the antistatic structure 23 to guide static electricity in all areas around the conductive layer 20 can be improved.

In a possible design, electrical connection may not be performed between the plurality of antistatic electrodes 23-1, and each antistatic electrode 23-1 is independently grounded through the electrostatic conducting wire 24.

Optionally, for a rectangular optical element 14, as shown in FIG. 7a, one antistatic electrode 23-1 may be disposed on one side of each side of the optical element 14. The antistatic electrode 23-1 may be in a square shape, for example, in a rectangle shape. As shown in FIG. 7b, two antistatic electrodes 23-1 may be disposed on one side of each long side of the optical element 14, and one antistatic electrode 23-1 may be disposed on one side of each short side of the optical element 14. The antistatic electrode 23-1 may be in a square shape, for example. In a rectangle shape. As shown in FIG. 7c, one antistatic electrode 23-1 may be disposed in each of four corners of the optical element 14. The antistatic electrode 23-1 may be in an L shape. It can be imagined that the plurality of antistatic electrodes 23-1 may further be disposed in other manners. These are not listed one by one herein.

Based on the foregoing design, referring to FIG. 6d again, a smaller spacing d between the orthographic projection of the antistatic electrode 23-1 on the plane defined by the optical element 14 and the optical element 14 is preferred. In this way, an antistatic capability of the antistatic electrode 23-1 to protect the conductive layer 20 attached to the optical element 14 can be improved as much as possible. For example, an edge that is of the orthographic projection of the antistatic electrode 23-1 on the plane defined by the optical element 14 and that is close to the optical element 14 coincides with a corresponding inner side edge of the top surface 12a, to minimize, as much as possible, the spacing d between the orthographic projection of the antistatic electrode 23-1 on the plane defined by the optical element 14 and the optical element 14.

Figure 6D:
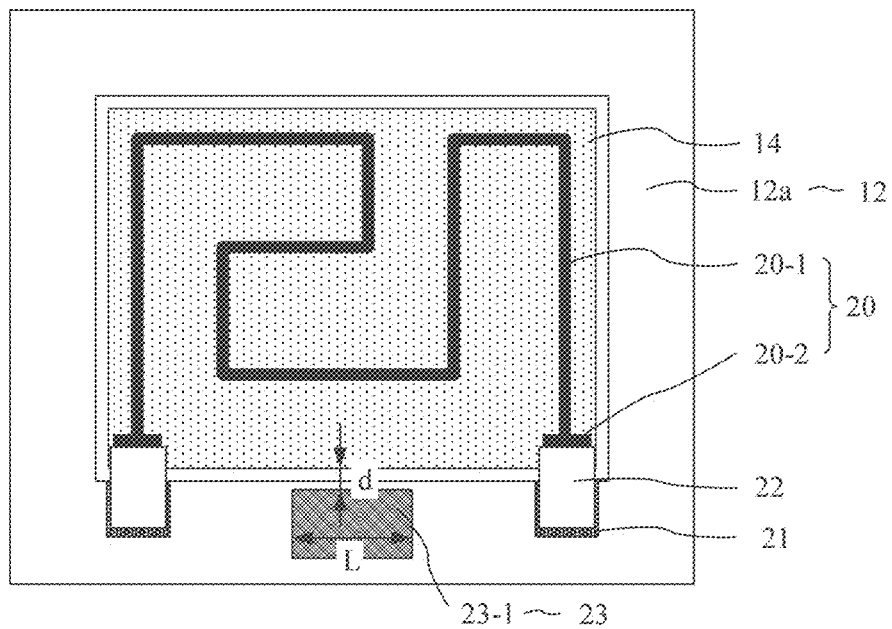
FIG. 6d is a top view of a first type of active light emitting module according to an embodiment of the present invention.

It should be noted that, still referring to FIG. 6d, a length L of the antistatic electrode 23-1 may be set to any value. This is not limited in the embodiments of the present invention. For example, the length L of the antistatic electrode 23-1 is less than or equal to a length of a side of the optical element 14 corresponding to the antistatic electrode 23-1. A shape of the antistatic electrode 23-1 may be set to any shape. This is not limited in the embodiments of the present invention. For example, the shape of the antistatic electrode 23-1 is a rectangle (as shown in FIG. 6d, FIG. 7a, and FIG. 7b), or the shape of the antistatic electrode 23-1 is an L shape (as shown in FIG. 7c).

In addition, for a scheme that a plurality of antistatic electrodes 23-1 are disposed on the top surface 12a of the lens tube 12, shapes and sizes of the plurality of antistatic electrodes 23-1 may be the same, to simplify process steps of manufacturing the plurality of antistatic electrodes 23-1.

In another possible design, as shown in FIG. 8*a* to FIG. 8*d*, the antistatic structure 23 is a frame-shaped conductive film, and extends along the frame-shaped top surface 12*a* of the lens tube 12, so that the antistatic structure 23 completely surrounds the conductive layer 20 within an area framed by the antistatic structure 23, and can guide static electricity from all areas around the conductive layer 20 to the ground terminal 25, greatly improving an antistatic effect of the antistatic structure 23 on the conductive layer 20.

Based on the foregoing design, widths of all parts of the frame-shaped conductive film used as the antistatic structure 23 are equal or unequal. For example, refer to FIG. 8*a* and FIG. 8*d*. Two ends of the detection line 20-1 of the conductive layer 20 are respectively connected to two conducting wires 21. The antistatic structure 23 avoids, at a position at an end (which is specifically referred to an end that is of the conducting wire 21 and that is connected to the detection line 20-1, and the end is referred to as a detection line connecting end below) of the conducting wire 2L the detection line connecting end of the conducting wire 21, so as to avoid an electrical connection to the detection line connecting end of the conducting wire 21, in the antistatic structure 23, widths of parts except the position of the corresponding detection line connecting end of the conducting wire 21 are equal. In the antistatic structure 23, a width of a part of the position of the corresponding detection line connecting end of the conducting wire 21 is less than a width of a remaining part, for example, s1=s2=s3>s4. In this way, it is ensured that each area around the conductive layer 20 is protected by the antistatic structure 23, and in foe antistatic structure 23, antistatic capabilities of parts except the position of the corresponding detection line connecting end are uniform and consistent, so that overall reliability of the lens 11 can be improved.

Figure 8A:
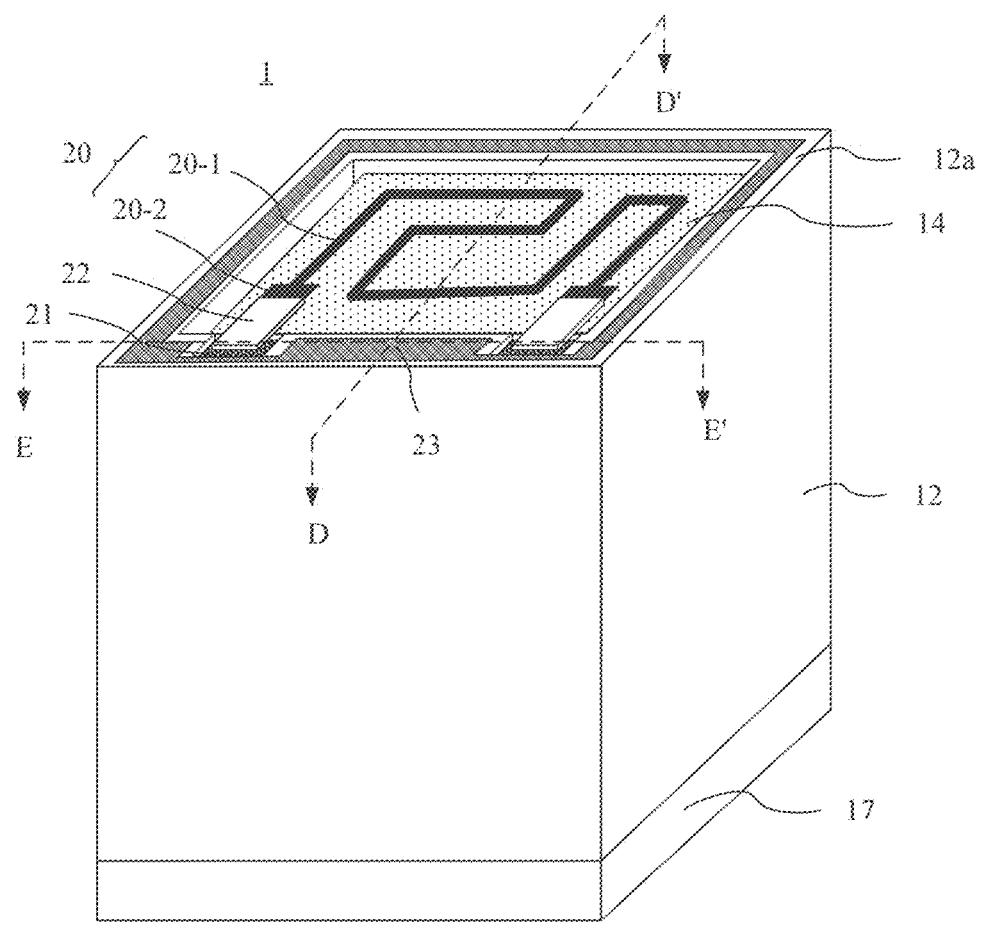
FIG. 8a is a three-dimensional diagram of a fifth type of active light emitting module according to an embodiment of the present invention.
Figure 8B:
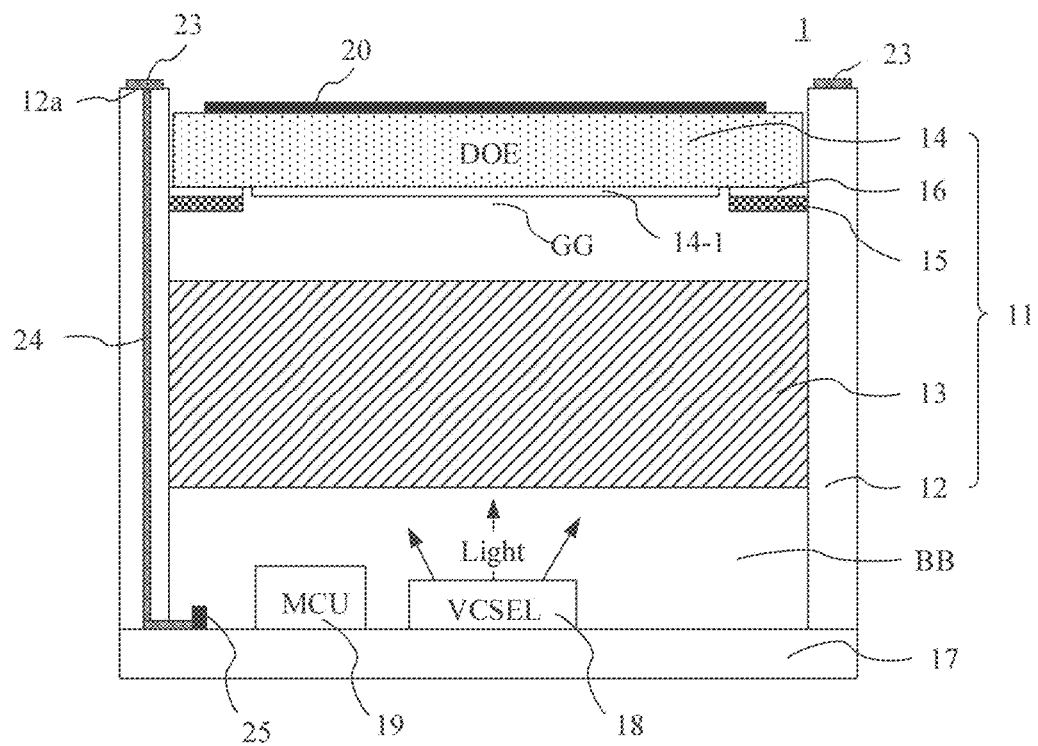
FIG. 8b is a sectional view of FIG. 8a along a dashed line DD'.
Figure 8C:
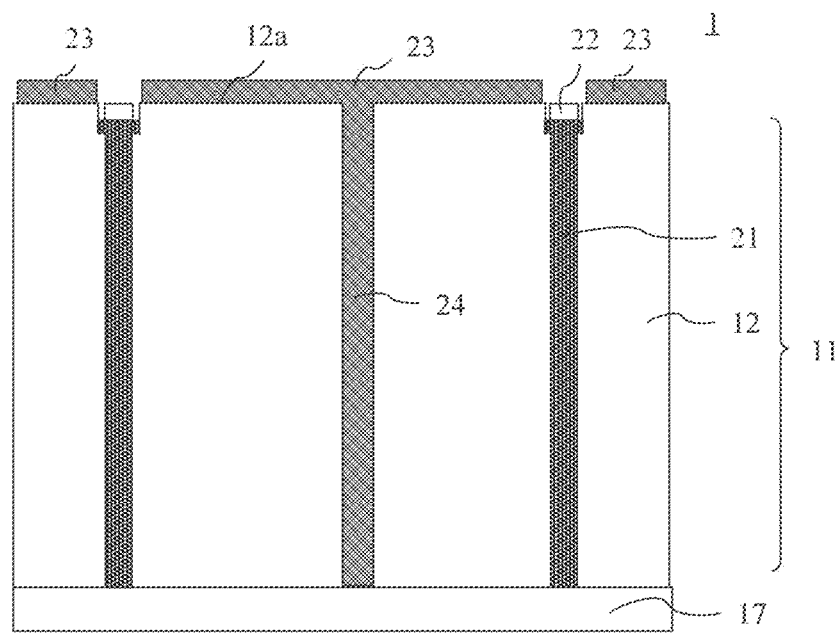
FIG. 8c is a sectional view of FIG. 8a along a dashed line EE'.
Figure 8D:
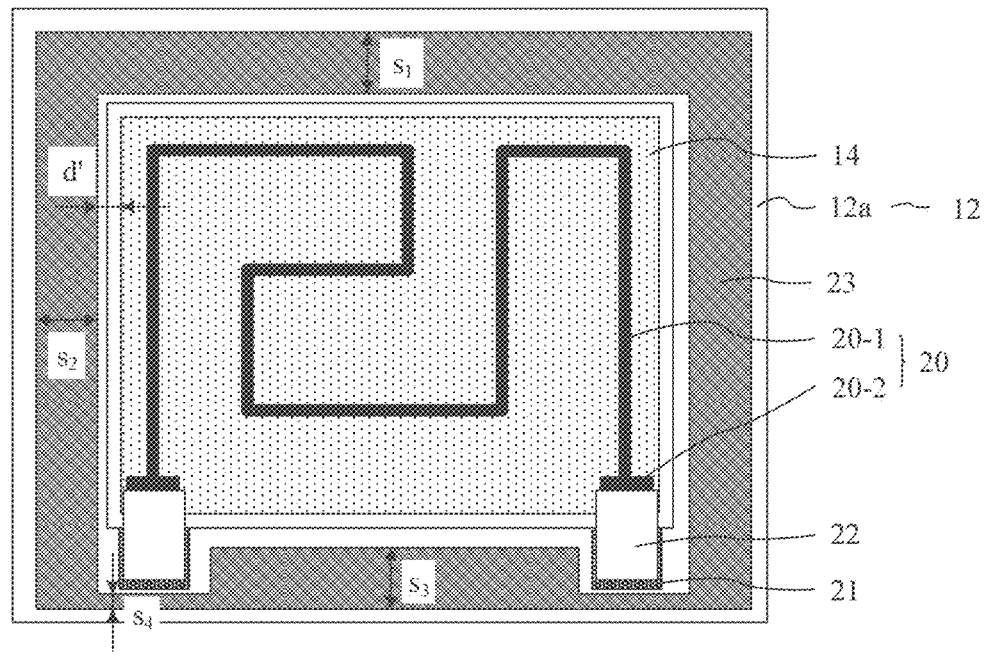
FIG. 8d is a top view of a fifth type of active light emitting module according to an embodiment of the present invention.

Still referring to FIG. 8*d*, in the orthographic projection of the antistatic structure 23 on the plane defined by the optical element 14, except the position of the corresponding detection line connecting end of the conducting wire 21, a spacing d' between each other position and the optical element 14 is equal. In this way, in the antistatic structure 23, the antistatic capabilities of parts except the position of the corresponding detection line connecting end of the conducting wire 21 are uniform and consistent. In addition, a smaller spacing d' is preferred. In this way, an antistatic capability of the antistatic structure 23 to protect the conductive layer 20 attached to the optical element 14 can be improved as much as possible. For example, in the orthographic projection of foe antistatic structure 23 on the plane defined by the optical element 14, except the position of the corresponding detection line connecting end of foe conducting wire 21, an edge that is of the remaining part and that is close to the optical element 14 coincides with a corresponding inner side edge of the top surface 12*a*, to reduce the spacing d' as much as possible.

Figure 8E:
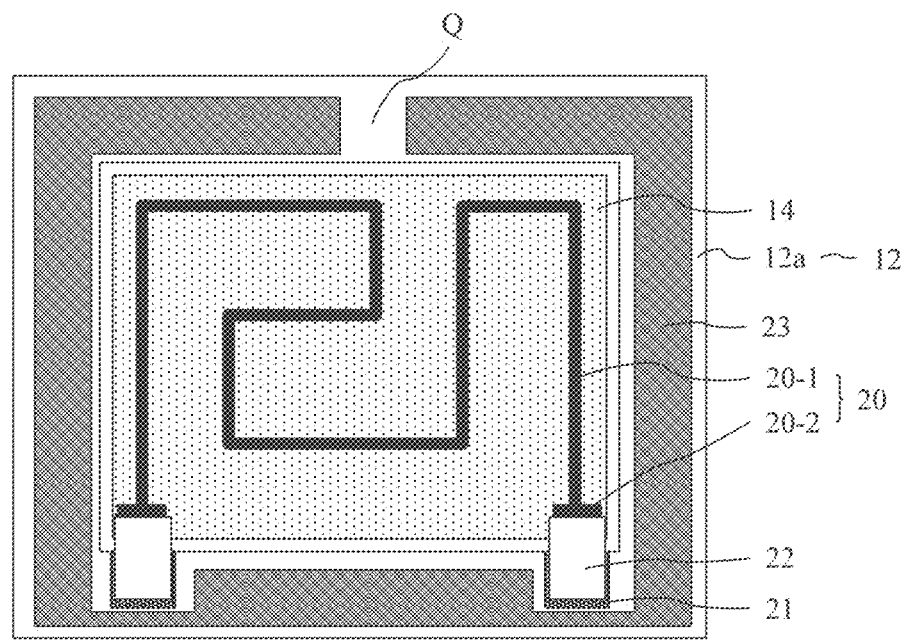
FIG. 8e is a top view of a sixth type of active light emitting module according to an embodiment of the present invention.

In a possible design, referring to FIG. 8*e*, a fracture Q may be disposed on the frame-shaped conductive film of the antistatic structure 23. The fracture Q may be disposed at any position except a position that is of the antistatic structure 23 and that is electrically connected to the electrostatic conducting wire 24. In this way, both a conductive film from one side of the fracture Q to the position that is of the antistatic structure 23 and that is electrically connected to foe electrostatic conducting wire 24 and a conductive film from the other side of the fracture Q to the position that is of the antistatic structure 23 and that is electrically connected to the electrostatic conducting wire 24 can be grounded through foe electrostatic conducting wire 24.

For example, for the rectangular optical element 14, the fracture Q may be disposed on a side of any side of the optical element 14, provided dial the fracture Q is away from the position that is of the antistatic structure 23 and that is electrically connected to the electrostatic conducting wire 24. Optionally, the optical element 14 includes a first side and a second side that are opposite to each other. The position that is of the antistatic structure 23 and that is electrically connected to the electrostatic conducting wire 24 is located on a side of the first side of the optical element, and the fracture Q is disposed on a side of the second side of the optical element. Farther, the position that is of the antistatic structure 23 and that is electrically connected to the electrostatic conducting wire 24 is located on a side of a midpoint position of the first side of the optical element, and the fracture Q is disposed on a side of a midpoint position of the second side of the optical element, in this way, the conductive film from one side of the fracture Q to the position that is of the antistatic structure 23 and that is electrically connected to the electrostatic conducting wire 24 and the conductive film from the other side of the fracture Q to the position that is of the antistatic structure 23 and that is electrically connected to the electrostatic conducting wire 24 have an equal or approximately equal length. This helps improve the antistatic capability of the antistatic structure 23.

In some embodiments, a material of the antistatic structure 23 may be a material with a relatively low resistivity. For example, the material of the antistatic structure 23 may be a material with a resistivity less than the resistivity of the conductive layer 20, so as to effectively attract and guide static electricity that is to enter the conductive layer 20. Optionally, a metal material such as copper (Cu), chromium (Cr), or silver (Ag) may be used as the material of the antistatic structure 23.

It should be noted that, as shown in FIG. 6*a* to FIG. 6*d*, FIG. 7*a*, and FIG. 7*b*, for a design in which the antistatic structure 23 includes the antistatic electrode 23-1, a material of the antistatic electrode 23-1 may be selected according to the foregoing principle. Further, as shown in FIG. 7*a* and FIG. 7*b*, for a design in which the antistatic structure 23 further includes a first electrode connection wire 23-2, a material of the first electrode connection wire 23-2 may be the same as the material of the antistatic electrode 23-1. In this way, the antistatic electrode 23-1 and the first electrode connection wire 23-2 may be manufactured in a same step, thereby simplifying process steps.

In some embodiments, a material of the lens tube 12 is LDS (Laser Direct structuring, laser direct structuring) plastic. The LDS plastic is a modified plastic that includes an organic metal complex. After being irradiated by a laser, the organic metal complex in the LDS plastic can release metal particles, so that a laser irradiated area becomes electrically conductive. The antistatic structure 23 may be manufactured by using an LDS technology. A manufacturing process is generally as follows: An area of the antistatic structure 23 to be formed on the top surface 12*a* of the lens tube 12 is irradiated by using a laser, so that metal particles are released from art organic metal complex in the laser irradiated area, and the LDS plastic material in the laser irradiated area is activated and becomes conductive, to form a pattern of the antistatic structure 23. A process of manufacturing the antistatic structure 23 by using the LDS technology is simple, and no additional conductive material needs to be prepared for forming the antistatic structure 23.

In some other embodiments, the antistatic structure 23 may be manufactured by using any one of processes such as electroplating, screen printing, coating, magnetron sputtering, and photolithography. This is not limited in the present invention.

In still other embodiments, a formed antistatic structure 23 may be directly fastened to the top surface 12*a* of the lens tube 12 by pasting, welding, or the like. The antistatic structure 23 and the electrostatic conducting wire 24 may be connected by welding, to ensure that the antistatic structure 23 is electrically connected to the electrostatic conducting wire 24.

In a possible design, a protective layer may be covered on the antistatic structure 23, to prevent the antistatic structure 23 from being corroded by factors such as water vapor and oxygen in an external environment, and protect the antistatic structure 23. A material of the protective layer may be an organic or inorganic material that has water and oxygen isolation and erosion resistance performance.

For a disposing manner of the electrostatic conducting wire 24, in some embodiments, as shown in FIG. 6*b*, the electrostatic conducting wire 24 extends inside the tube wall of the lens tube 12. One end of the electrostatic conducting wire 24 extends to the antistatic structure 23, and the other end extends to the ground terminal 25 of the bottom substrate 17. The electrostatic conducting wire 24 is disposed inside the tube wall of the lens tube 12, so that the electrostatic conducting wire 24 can be prevented from being corroded by the factors such as water vapor and oxygen in the external environment while implementing grounding of the antistatic structure 23, to protect the electrostatic conducting wire 24.

In the foregoing design shown in FIG. 6*b*, an insert molding (Insert Molding) technology may be used to integrally mold the electrostatic conducting wire 24 and the lens tube 12. Alternatively, a channel may be formed in foe lens tube 12, and then a solution of the material of the electrostatic conducting wire 24 is injected into the channel, to form the electrostatic conducting wire 24.

Figure 9A:
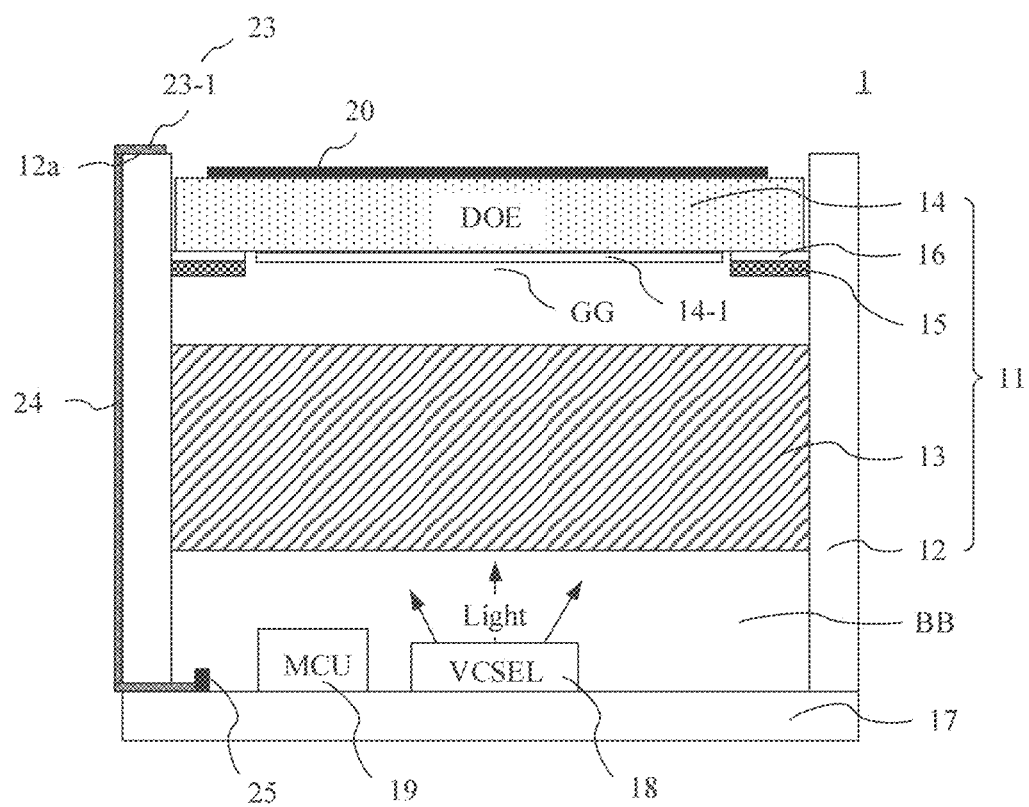
FIG. 9a is a sectional view of a seventh type of active light emitting module according to an embodiment of the present invention.
Figure 9B:
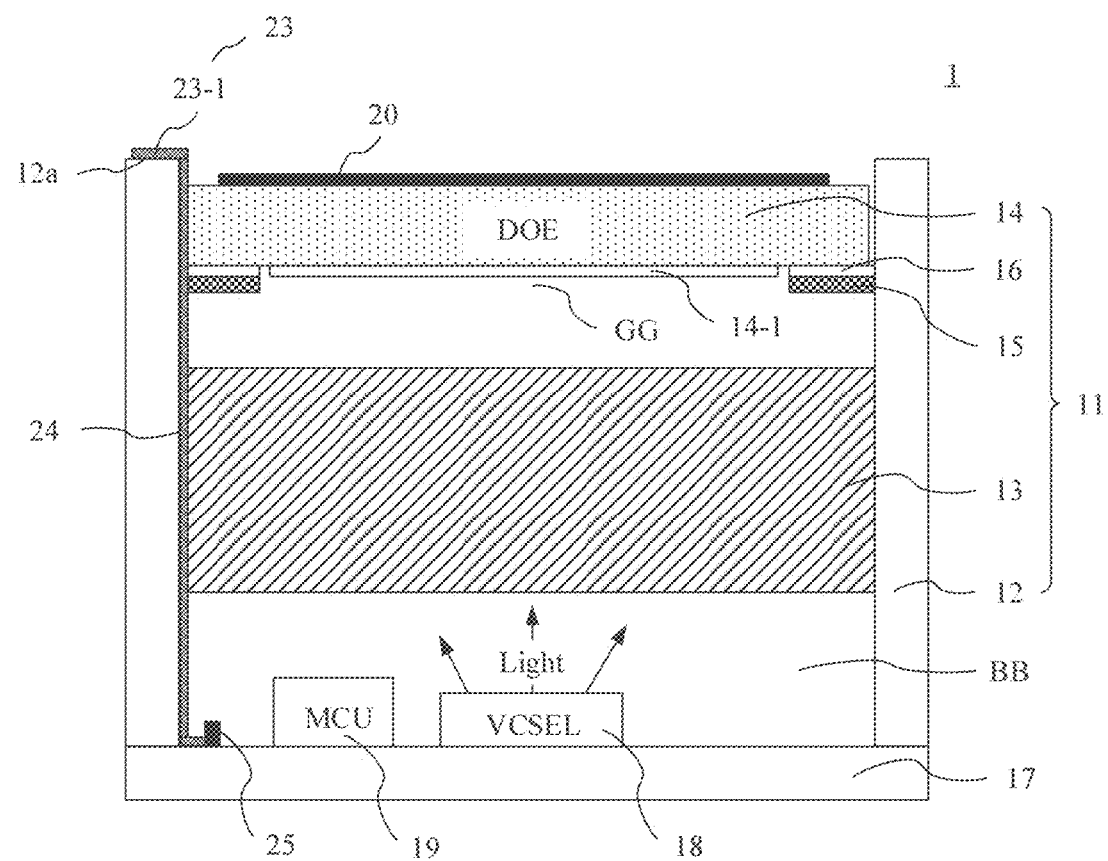
FIG. 9b is a sectional view of an eighth type of active light emitting module according to an embodiment of the present invention.

In another design, as shown in FIG. 9*a*, foe electrostatic conducting wire 24 extends on an outer surface of the lens tube 12. Alternatively, as shown in FIG. 9*b*, the electrostatic conducting wire 24 extends on an inner surface of the lens tube 12. In the design shown in FIG. 9*a* and FIG. 9*b*, foe electrostatic conducting wire 24 may be formed on the outer surface or the inner surface of the lens tube 12 through coating, printing, pasting, or the like. In addition, a protective layer may be formed on the electrostatic conducting wire 24 to cover the electrostatic conducting wire 24, to prevent the electrostatic conducting wire 24 from being exposed and being corroded. A material of the protective layer may be an organic or inorganic material that has water and oxygen isolation and erosion resistance performance.

A material of foe electrostatic conducting wire 24 may be a material having conductive performance, for example, a metal conductive material such as silver (Ag), copper (Cu), or chromium (Cr), a semiconductor conductive material, or an oxide conductive material. Further, the material of the electrostatic conducting wire 24 may be the same as a material of the antistatic structure 23, to reduce contact resistance between the electrostatic conducting wire 24 and the antistatic structure 23.

In some embodiments of the present invention, two ends of foe detection line 20-1 of the conductive layer 20 are respectively connected, through two conducting wires 21, to the microprocessor 19 disposed on the bottom substrate 17 of the active light emitting module 1. The two conducting wires 21 extend in the lens tube 12, or on an inner surface or an outer surface of the lens tube 12. Referring to FIG. 5*a*, a manner in which the two conducting wires 21 are connected to the microprocessor 19 is as follows: A positive terminal e and a negative terminal f are disposed on the bottom substrate 17 of the active light emitting module 1, foe two conducting wires 21 are respectively connected to the positive terminal e and the negative terminal f, and the positive terminal e and the negative terminal f are respectively connected to two ports of the microprocessor 19. The negative terminal f is connected to the ground terminal 25 disposed on the bottom substrate 17, or the negative terminal and the ground terminal 25 are configured as a same terminal. In this way, it is equivalent to that the conducting wire 21 that is in the two conducting wires 21 and that is connected to the negative terminal f is grounded. Because one end that is of the electrostatic conducting wire 24 connected to the antistatic structure 23 and that is away from the antistatic structure 23 needs to be grounded, and the electrostatic conducting wire 24 extends in the lens tube 12, or on the inner surface or the outer surface of the lens tube 12, as shown in FIG. 10*a* to FIG. 10*c*, FIG. 11*a* to FIG. 11*c*, FIG. 12*a* to FIG. 12*c*, and FIG. 13*a* to FIG. 13*c*, the electrostatic conducting wire 24 may reuse the conducting wire 21 (the conducting wire 21 is referred to as a negative electrode ground wire below) that is connected to the negative terminal f and that is grounded in the two conducting wires 21. That is, the electrostatic conducting wire 24 and the negative electrode ground wire are configured as a same conductive line. In this way, a structure and a manufacturing process of the lens 11 can be simplified.

It should be noted that although the electrostatic conducting wire 24 and the negative electrode ground wire are configured as a same conductive line, because the negative electrode ground wire (namely, the electrostatic conducting wire 24) is grounded, static electricity transmitted to the negative electrode ground wire (namely, the electrostatic conducting wire 24) through the antistatic structure 23 is preferably transmitted (flowing) to the ground terminal, and is not transmitted to the conductive layer 20 along the negative electrode ground wire (namely, the electrostatic conducting wire 24). In this way, it is ensured that an electrostatic protection effect of the antistatic structure 23 on the conductive layer 20 is achieved.

Based on the foregoing design, for example, refer to FIG. 10*a* to FIG. 10*c* and FIG. 12*a* to FIG. 12*c*. The lens 11 further includes a second electrode connection wire 26. The second electrode connection wire 26 electrically connects the antistatic structure 23 and the negative electrode ground wire, so that the negative electrode ground wire is used as the electrostatic conducting wire 24. The antistatic structure 23 is grounded through the second electrode connection wire 26 and the negative electrode ground wire (namely, the electrostatic conducting wire 24).

Figure 10A:
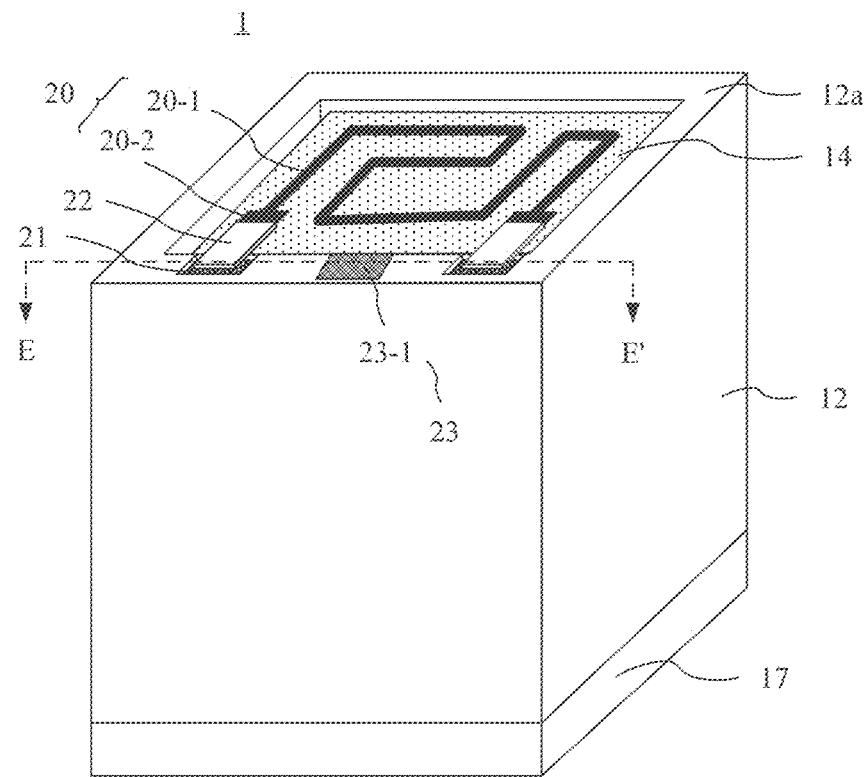
FIG. 10a is a three-dimensional diagram of a ninth type of active light emitting module according to an embodiment of the present invention.
Figure 10B:
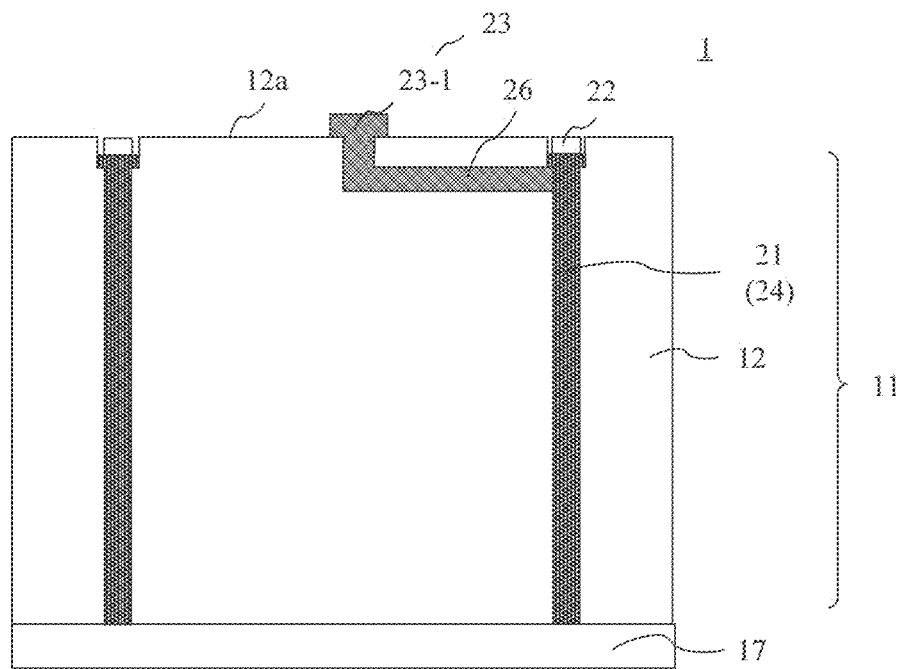
FIG. 10b is a sectional view of FIG. 10a along a dashed line EE'.
Figure 10C:
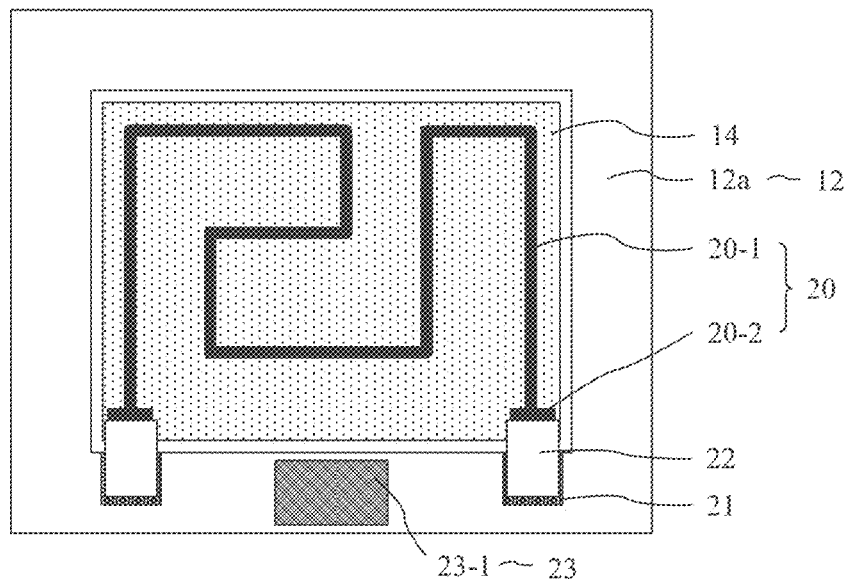
FIG. 10c is atop view of a ninth type of active light emitting module according to an embodiment of the present invention.

In a possible design, refer to FIG. 10*a* to FIG. 10*c* for a lens 11 in which the antistatic structure 23 includes one antistatic electrode 23-1. The antistatic electrode 23-1 may be disposed between ends that are of the two conducting wires 21 and that are connected to the detection line 20-1 (that is, between the two conductive electrodes 22). In this way, a distance between the antistatic electrode 23-1 and the negative electrode ground wire is relatively short. This helps shorten a length of the second electrode connection wire 26.

In another possible design, for a lens 11 in which the antistatic structure 23 includes a plurality of antistatic electrodes 23-1, the plurality of antistatic electrodes 23-1 are connected to each other through the first electrode connection wire 23-2, and an antistatic electrode 23-1 that is in the plurality of antistatic electrodes 23-1 and that is closest to the negative electrode ground wire is connected to the negative electrode ground wire through the second electrode connection wire 26. This helps shorten a length of the second electrode connection wire 26. Further, the antistatic electrode 23-1 that is in the plurality of antistatic electrodes 23-1 and that is closest to the negative electrode ground wire is disposed between the ends that are of the two conducting wires 21 and that are connected to the detection line 20-1 (that is, between the two conductive electrodes 22). For a disposing manner of the antistatic electrode 23-1 and the second electrode connection wire 26 connected to the antistatic electrode 23-1, refer to FIG. 9b.

Figure 12A:
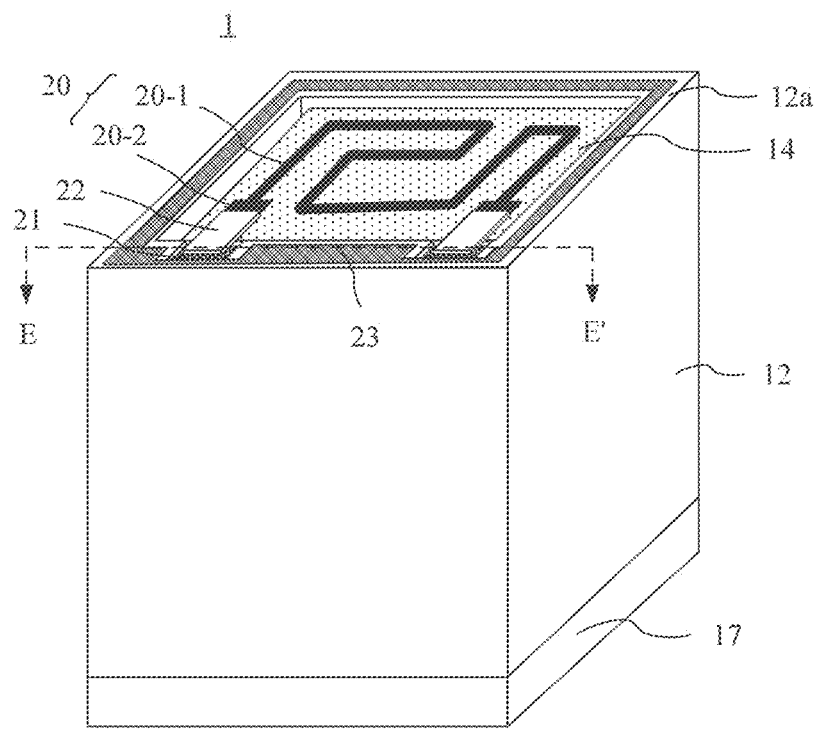
FIG. 12a is a three-dimensional diagram of an eleventh type of active light emitting module according to an embodiment of the present invention.
Figure 12B:
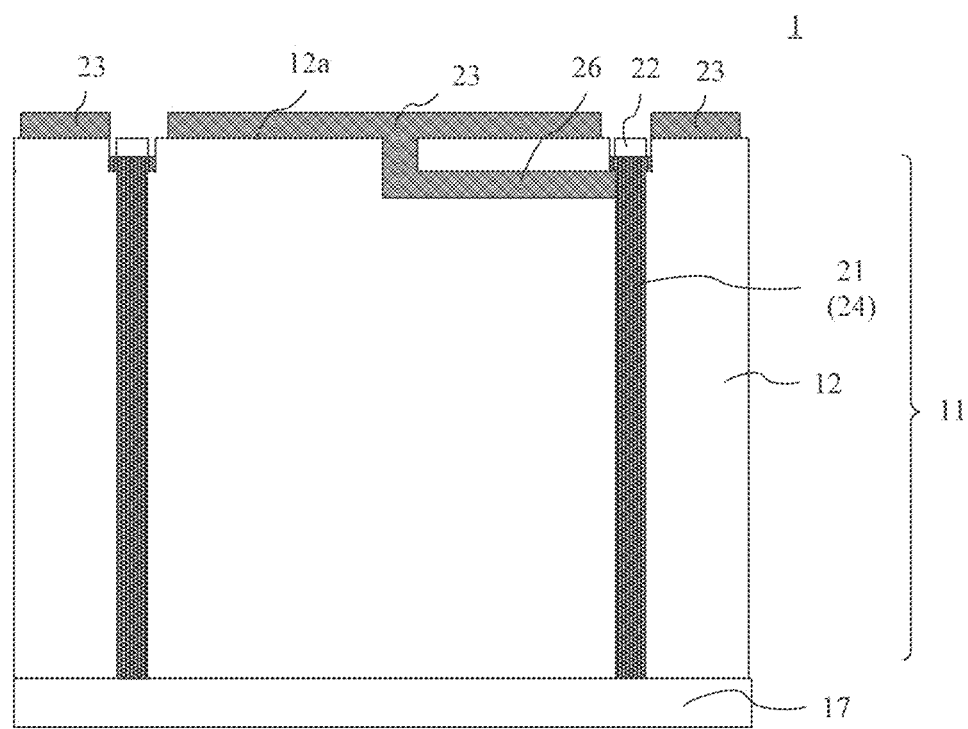
FIG. 12b is a sectional view of FIG. 12a along a dashed line EE'.
Figure 12C:
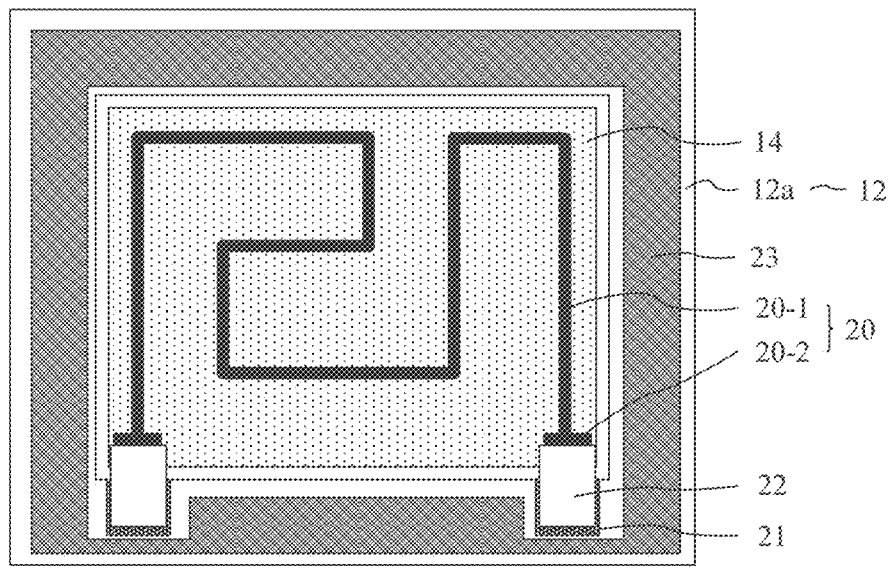
FIG. 12c is a top view of an eleventh type of active light emitting module according to an embodiment of the present invention.

In still another possible design, refer to FIG. 12a to FIG. 12c for a lens 11 in which the antistatic structure 23 is a frame-shaped conductive film. A joint of the antistatic structure 23 and the second electrode connection wire 26 may be disposed between ends that are of the two conducting wires 21 and that are connected to the detection line 20-1 (that is, between the two conductive electrodes 22). In this way, a distance between the negative electrode ground wire and the joint of the antistatic structure 23 and the second electrode connection wire 26 is relatively short. This helps shorten a length of the second electrode connection wire 26.

The second electrode connection wire 26 may be disposed inside the tube wall, or on the outer surface or the inner surface of the lens tube 12. This is not limited in the embodiments of the present invention. Optionally, the second electrode connection wire 26 and the negative electrode ground wire (namely, the electrostatic conducting wire 24) may be disposed in a same manner. For example, both the second electrode connection wire 26 and the negative electrode ground wire (namely, the electrostatic conducting wire 24) are disposed inside the tube wall of the lens tube 12, or both are disposed on the outer surface of the lens tube 12, or both are disposed on the inner surface of the lens tube. FIG. 10a to FIG. 10c, and FIG. 12a to FIG. 12c show examples in which both are disposed inside the tube wall of the lens 12. In this way, the second electrode connection wire 26 and the negative electrode ground wire (namely, the electrostatic conducting wire 24) may be formed in a same step. This helps simplify the manufacturing process of the lens 11.

A material of the second electrode connection wire 26 may be a material having conductive performance, for example, a metal conductive material such as silver (Ag), copper (Cu), or chromium (Cr), a semiconductor conductive material, or an oxide conductive material. Further, the material of the second electrode connection wire 26 may be the same as that of the negative electrode ground wire (namely, the electrostatic conducting wire 24), so that the second electrode connection wire 26 and the negative electrode ground wire (namely, the electrostatic conducting wire 24) may be formed in a same step.

Based on a design in which the electrostatic conducting wire 24 and the negative electrode ground wire are configured as a same conductive line, for example, in FIG. 11a to FIG. 11c and FIG. 13a to FIG. 13c, a part of an end that is close to the negative electrode ground wire and that is connected to the detection wire 20-1 in the antistatic structure 23 extends to an end that is of the negative electrode ground wire and that is connected to the detection wire 20-1, so that the antistatic structure 23 is electrically connected to the negative electrode ground wire, the negative electrode ground wire is used as the electrostatic conducting wire 24, and the antistatic structure 23 is grounded through the negative electrode ground wire (namely, an electrostatic conducting wire 24).

Figure 11A:
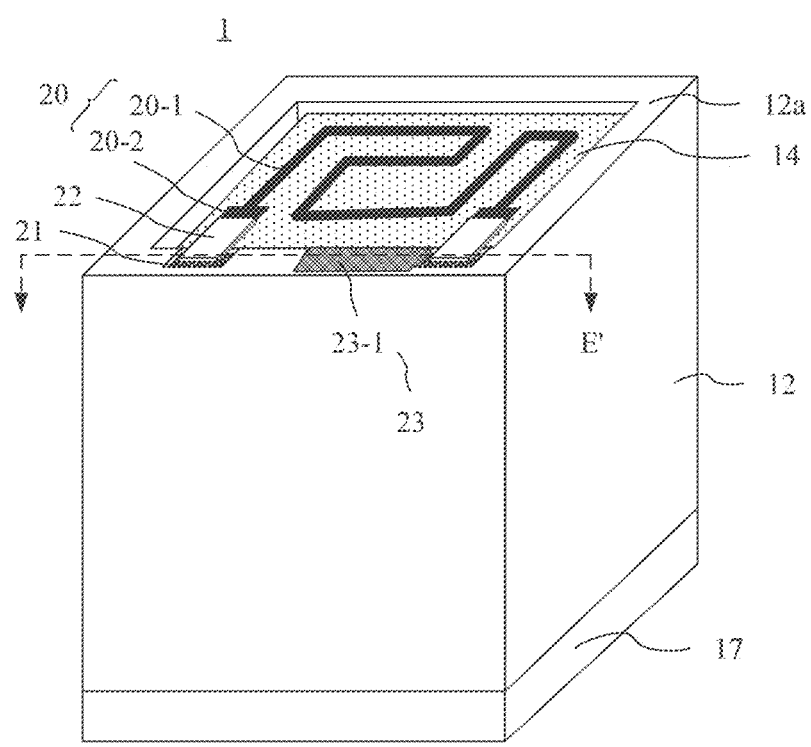
FIG. 11a is a three-dimensional diagram of a tenth type of active light emitting module according to an embodiment of the present invention.
Figure 11B:
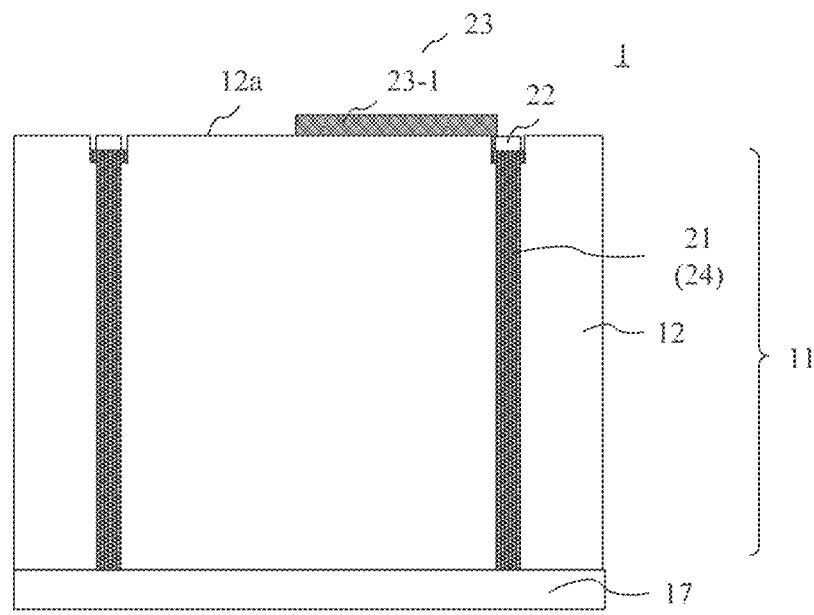
FIG. 11b is a sectional view of FIG. 11a along a dashed line EE'.
Figure 11C:
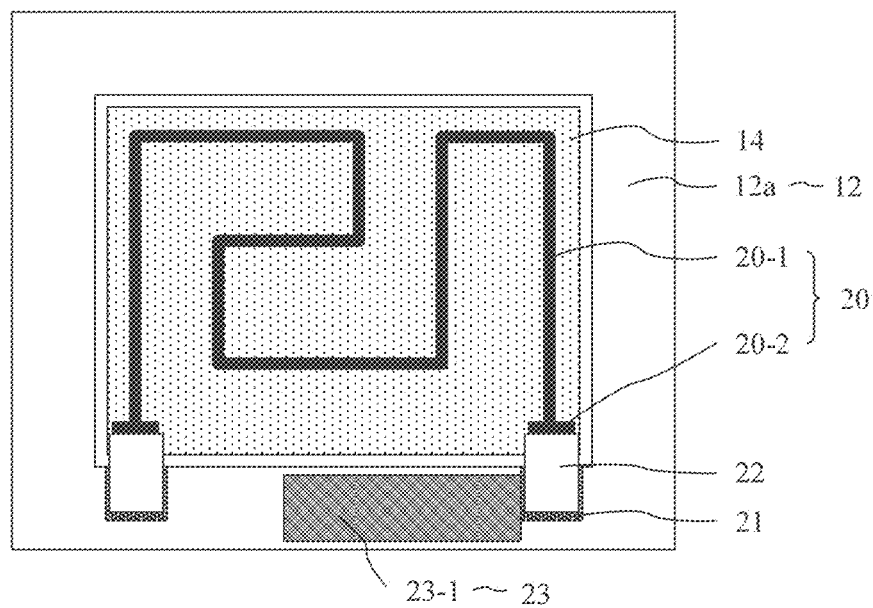
FIG. 11c is a top view of a tenth type of active light emitting module according to an embodiment of the present invention.

In a possible design, refer to FIG. 11a to FIG. 11c for a lens 11 in which the antistatic structure 23 includes one antistatic electrode 23-1. The antistatic electrode 23-1 may be disposed between ends that are of the two conducting wires 21 and that are connected to the detection line 20-1 (that is, between the two conductive electrodes 22). The part of the end that is close to the negative electrode ground wire and that is connected to the detection wire 20-1 in the antistatic structure 23 extends to the end that is of the negative electrode ground wire and that is connected to the detection wire 20-1, in this way, the antistatic electrode 23-1 can be electrically connected to the negative electrode ground wire without an additional structure used to electrically connect the antistatic electrode 23-1 and the negative electrode ground wire. The structure is simple and easy to implement.

In another possible design, for a lens 11 in which the antistatic structure 23 includes a plurality of antistatic electrodes 23-1, the plurality of antistatic electrodes 23-1 are connected to each other through the first electrode connection wire 23-2, and an antistatic electrode 23-1 that is in the plurality of antistatic electrodes 23-1 and that is closest to the negative electrode ground wire is extended to an end that is of the negative electrode ground wire and that is connected to the detection line 20-1, so that the plurality of antistatic electrodes 23-1 are electrically connected to the negative electrode ground wire. Further, the antistatic electrode 23-1 that is in the plurality of anti static electrodes 23-1 and that is closest to the negative electrode ground wire is disposed between the ends that are of the two conducting wires 21 and that are connected to the detection line 20-1 (that is, between the two conductive electrodes 22). For a disposing manner in which the antistatic electrode 23-1 is electrically connected to the negative electrode ground wire, refer to FIG. 11b and FIG. 11c.

Figure 13A:
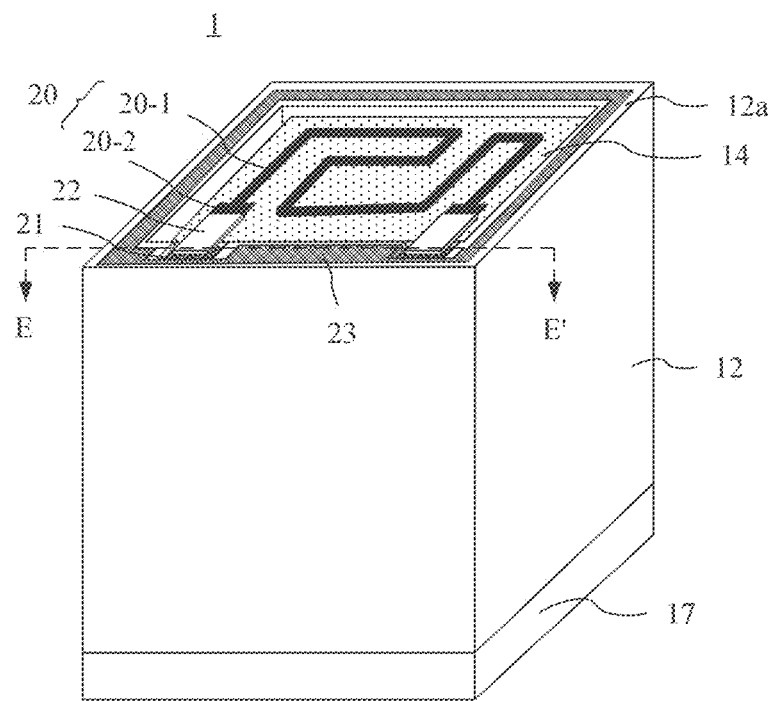
FIG. 13a is a three-dimensional diagram of a twelfth type of active light emitting module according to an embodiment of the present invention.
Figure 13B:
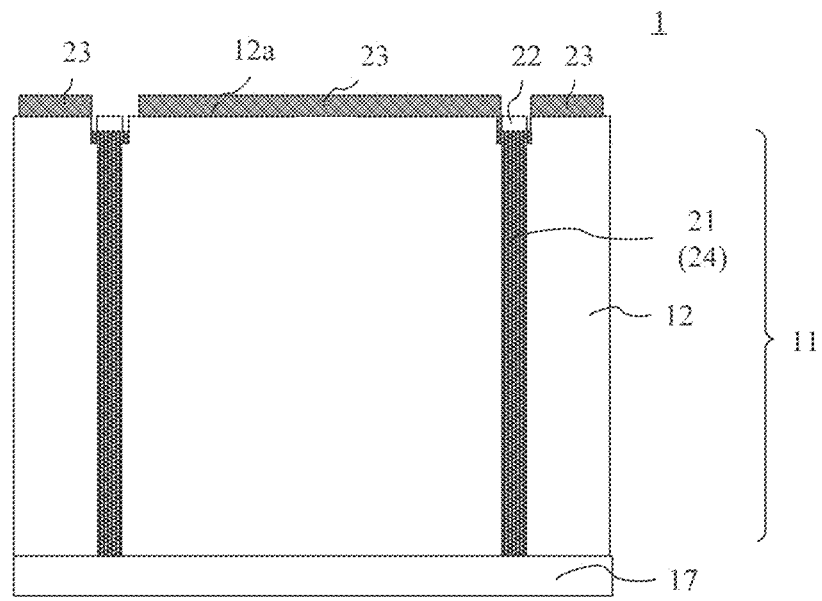
FIG. 13b is a sectional view of FIG. 13a along a dashed line EE'.
Figure 13C:
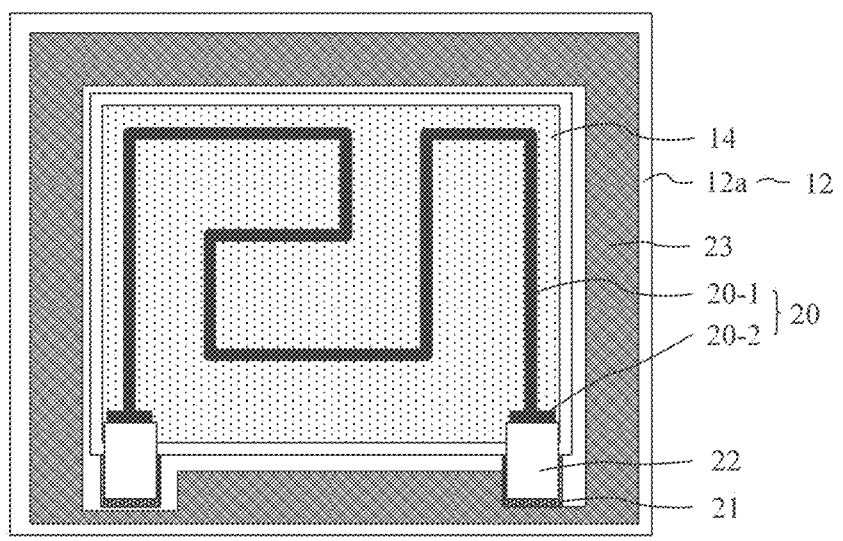
FIG. 13c is a top view of a twelfth type of active light emitting module according to an embodiment of the present invention.

In still another possible design, refer to FIG. 13a to FIG. 13c for a lens 11 in which the antistatic structure 23 is a frame-shaped conductive film. A part of an end that is close to the negative electrode ground wire and that is connected to the detection wire 20-1 in the antistatic structure 23 may be extended to an end that is of the negative electrode ground wire and that is connected to the detection line 20-L so that the antistatic structure 23 is electrically connected to the negative electrode ground wire.

It should be noted that, in some embodiments of the present invention, referring to FIG. 6b, the lens 11 further includes the lens component 13. The lens component 13 is mounted inside the lens tube 12, and is located on a side that is of the holding structure 15 and that is opposite to the optical element 14. The lens component 13 may be fastened inside the lens tube 12 through bonding, clamping, embedding, or the like. The lens component 13 includes at feast one optical lens. When the lens component 13 includes a plurality of optical lenses, the lens component 13 is formed by superimposing the plurality of optical lenses. The optical lens may be, for example, a convex lens. The lens component 13 is configured to collimate and converge light passing through the lens component 13.

Based on the foregoing description of the lens 11 provided in the embodiments of the present, invention, the embodiments of the present invention further provide an active light emitting module. As shown in FIG. 6a to FIG. 6d and FIG. 8a to FIG. 8d, the active light emitting module 1 includes at least the lens 11, the bottom substrate 17, the laser 18, and the microprocessor 19 that are provided in the embodiments of the present invention. The lens 11 includes the lens tube 12, the lens component 13, and the optical element 14. The lens tube 12 is mounted on one side of the bottom substrate 17, and forms a receptacle BB with the bottom substrate 17. The laser IS, the microprocessor 19, the lens component 13, and the optical element 14 are ail mounted in the receptacle BB. The conductive layer 20 configured to monitor the damage or fall-off status of the optical element 14 is disposed on the surface that is of the optical element 14 and that is opposite to the laser IS.

The antistatic structure 23 is disposed on the top surface 12a of the lens tube 12. The electrostatic conducting wire 24 is disposed inside the tube wall, or on the inner surface or the outer surface of the lens tube 12. The ground terminal 25 is disposed on the bottom substrate 17. One end of the electrostatic conducting wire 24 is connected to the antistatic structure 23, and the other end is connected to the ground terminal 25, so that the antistatic structure 23 is grounded. The antistatic structure 23 can guide static electricity passing through the antistatic structure 23 to the ground terminal through the electrostatic conducting wire 24, and the antistatic structure 23 can further attract static electricity near the antistatic structure 23, and then guide the attracted static electricity to the ground terminal through the electrostatic conducting wire 24. This effectively reduces a risk that the conductive layer 20 is damaged by the static electricity, and protects the conductive layer 20 and the microprocessor 19 connected to the conductive layer 20.

In a possible design, as shown in FIG. 6b and FIG. 8b, the ground terminal 25 may be disposed in the receptacle ink in this way, an end that is of the electrostatic conducting wire 24 and that is connected to the ground terminal 25 needs to extend to inside of the receptacle BB, and is electrically connected to the ground terminal 25. Certainly, the ground terminal 25 may further be disposed outside the receptacle BB. In this way, the end that is of the electrostatic conducting wire 24 and that is connected to the ground terminal 25 needs to extend to the inside of the receptacle BB, and is electrically connected to the ground terminal 25.

In some embodiments, referring to FIG. 5a, and FIG. 14a to FIG. 14c, two ends of the detection line 20-1 of the conductive layer 20 of the optical element 14 are separately connected, through two conducting wires 21, to the microprocessor 19 disposed on the bottom substrate 17 of the active light emitting module 1. A manner in which the two conducting wires 21 are connected to the microprocessor 19 is as follows: The positive terminal e and the negative terminal fare disposed on the bottom substrate 17, the two conducting wires 21 are respectively connected to the positive terminal e and the negative terminal f, and the positive terminal e and the negative terminal fare respectively connected to two ports of the microprocessor 19. The negative terminal and the ground terminal 25 are configured as a same terminal. In other words, the conducting wire 21 (namely, the negative electrode ground wire) that is in the two conducting wires 21 and that is connected to the negative terminal f is grounded. The electrostatic conducting wire 24 connected to the antistatic structure 23 and the negative electrode ground wire are configured as a same conductive line, and the antistatic structure 23 and the negative electrode ground wire (namely, the electrostatic conducting wire 24) are electrically connected.

Figure 14A:
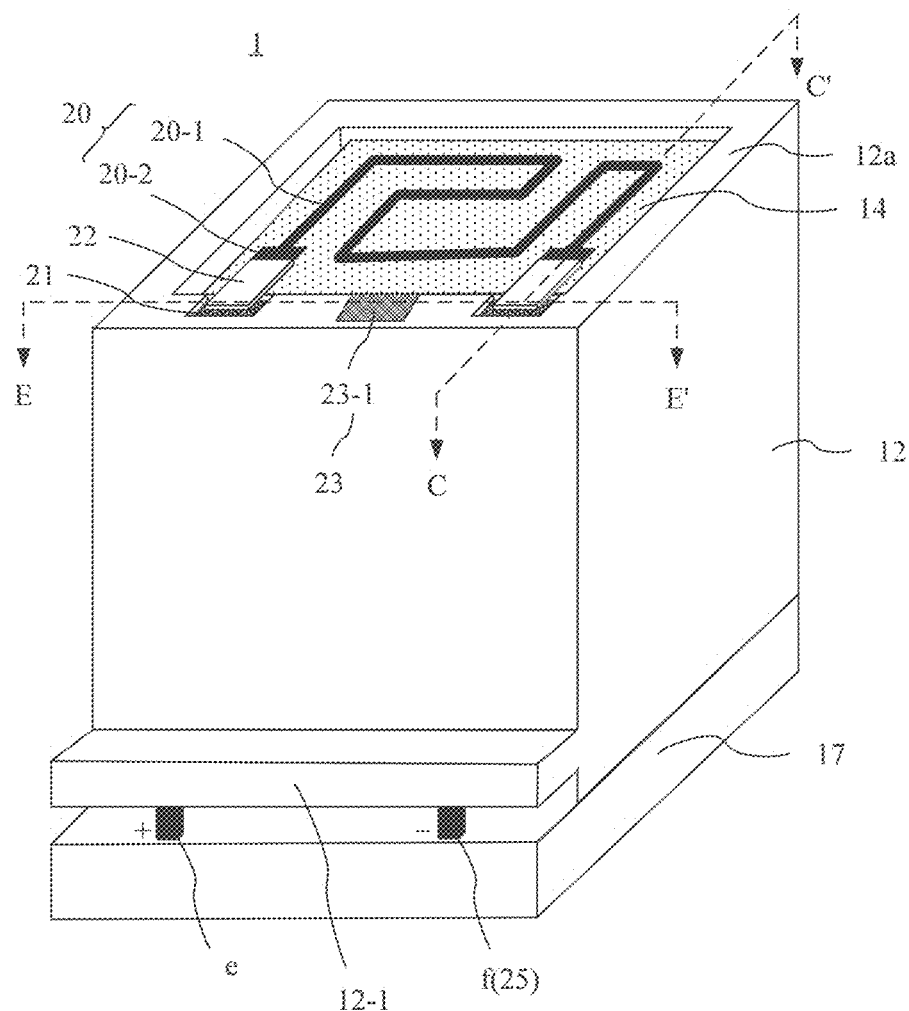
FIG. 14a is a three-dimensional diagram of a thirteenth type of active light emitting module according to an embodiment of the present invention.
Figure 14B:
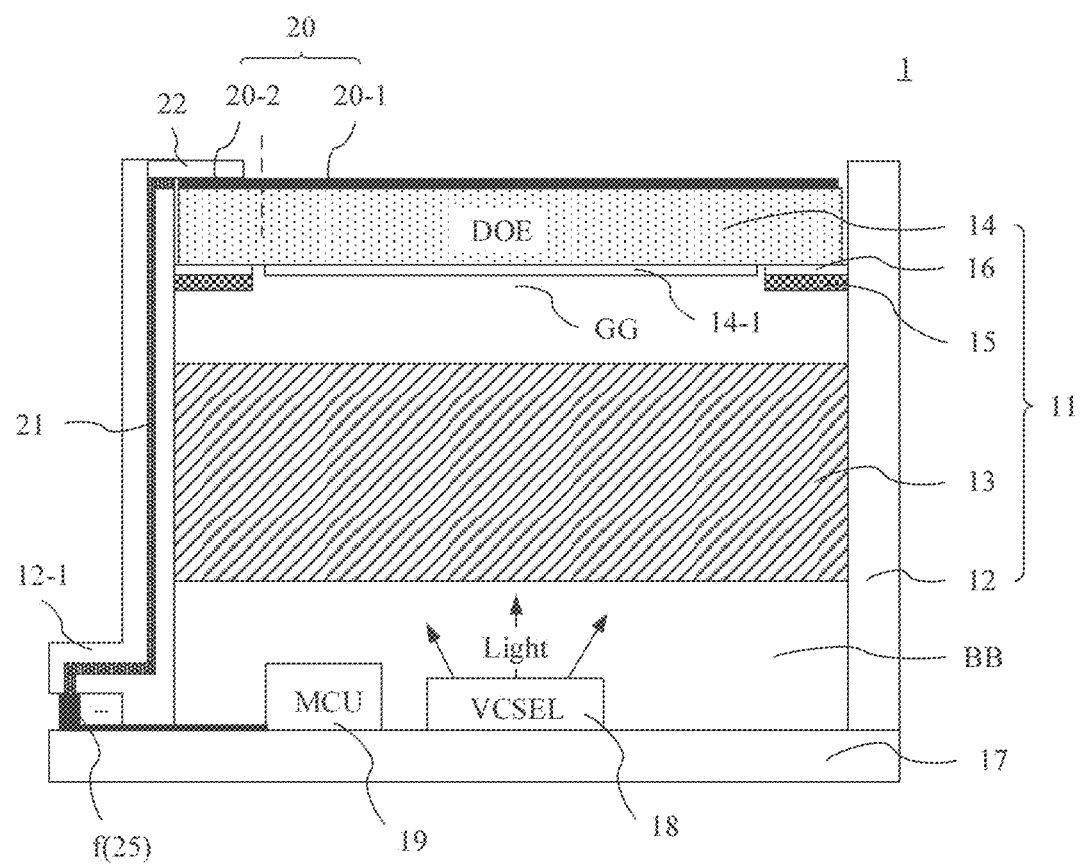
FIG. 14b is a sectional view of FIG. 14a along a dashed line CC.
Figure 14C:
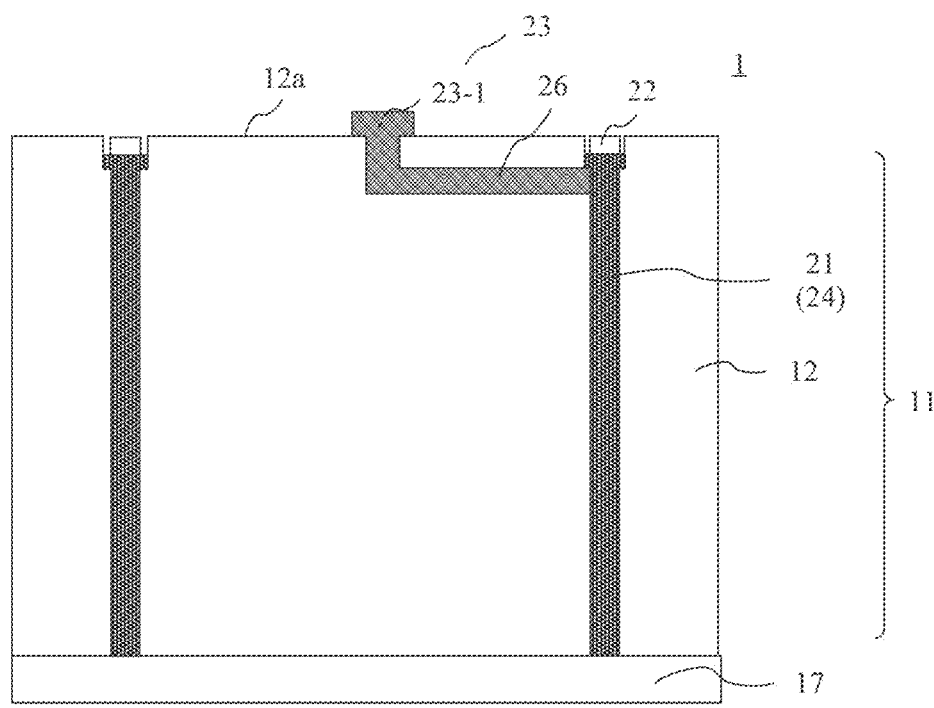
FIG. 14c is a sectional view of FIG. 14a along a dashed line EE'.

In the foregoing design, for a possible design, refer to FIG. 14a to FIG. 14c. Tire positive terminal e and the negative terminal f (namely, the ground terminal 25) are disposed outside the receptacle BB, and ends that are of the two conducting wires 21 and that are connected to the positive terminal e and the negative terminal f (namely, the ground terminal 25) extend to outside of the receptacle BB to connect to a corresponding electrical terminal (namely, the positive terminal e or the negative terminal f). Optionally, a protruding part 12-1 is disposed on an outer surface of the lens tube 12, and the protruding part 12-1 is located at least above the positive terminal e and the negative terminal f, in this way, the ends that are of the two conducting wires 21, which are the positive terminal e and the negative terminal f, may extend to the protruding part 12-1, so as to extend to an upper part of the positive terminal e and the negative terminal f, and be connected to the corresponding electrical terminal.

Certainly, the positive terminal e and the negative terminal f (namely, the ground terminal 25) may alternatively be disposed inside the receptacle BB, and the ends that are of the two conducting wires 21 and that are connected to the positive terminal e and the negative terminal f (namely, the ground terminal 25) extend to inside of the receptacle BB to connect to the corresponding electrical terminal (namely, the positive terminal e or foe negative terminal f).

It should be noted that the active light emitting module 1 provided in the embodiments of the present invention is any module that can emit laser light, for example, the module that is in the TOP 3D sensing module and that includes the high-power laser, or the dot projector 115-5 and the flood illuminator 115-2 that are in foe structured light 3D sensing module 115.

Based on the foregoing descriptions of the active light emitting module 1 provided in the embodiments of the present invention, an embodiment of the present invention further provides a terminal. The terminal includes the active light emitting module 1 provided in the embodiments of the present invention, configured to provide specified laser light (for example, if the active light emitting module 1 is the dot projector 115-5, the specified light that needs to be provided by the active light emitting module 1 is structured light), to assist the terminal in implementing a 3D sensing function. The active light emitting module 1 is mounted in a terminal such as the mobile phone 100, a side of the laser 18 (namely, a light emitting side) in the active light emitting module 1 is close to inside of the terminal, and a side of the optical element 14 (namely, a light output side) faces outside of the terminal, to project the specified laser fight outward.

The foregoing descriptions are merely specific implementations of the present invention, but are not intended to limit the protection, scope of the present invention. Any variation or replacement within the technical scope disclosed in the present invention shall fall within the protection scope of the present invention. Therefore, the protection scope of the present invention shall be subject to the protection scope of the claims.

What is claimed is:

1. A lens comprising:
a lens tube comprising:
a top surface;
a tube wall;
an inner surface; and
an outer surface;

an optical element mounted in the lens tube and comprising a first surface that faces the same direction as the top surface;
a conductive layer disposed on the first surface;
an antistatic structure disposed on the top surface; and
an electrostatic conducting wire disposed inside the tube wall, on the inner surface, or on the outer surface, wherein the electrostatic conducting wire comprises:
a first end electrically coupled to the antistatic structure; and
a second end that is grounded.

2. The lens of claim 1, wherein the antistatic structure comprises a frame-shaped conductive film electrically coupled to the electrostatic conducting wire, and wherein an orthographic projection of the frame-shaped conductive film on a plane defined by the optical element surrounds the conductive layer.

3. The lens of claim 1, wherein the antistatic structure comprises an antistatic electrode electrically coupled to the electrostatic conducting wire.

4. The lens of claim 1, wherein the conductive layer comprises a detection line comprising a third end and a fourth end, wherein the lens further comprises a first conducting wire and a second conducting wire that are disposed inside the tube wall, on the inner surface, or on the outer surface, wherein the first conducting wire couples the third end to an external positive terminal, wherein the second conducting wire couples the fourth end to an external negative terminal that is grounded, and wherein the electrostatic conducting wire and the second conducting wire are configured as a same conductive line.

5. The lens of claim 4, further comprising a second electrode connection wire, wherein the second electrode connection wire comprises:
a fifth end electrically coupled to the antistatic structure; and
a sixth end electrically coupled to the second conducting wire.

6. The lens of claim 5, wherein the second electrode connection wire and the second conducting wire are both disposed inside the tube wall, on the outer surface, or on the inner surface.

7. The lens of claim 5, wherein a part of the antistatic structure is configured to couple to the second electrode connection wire and is located between a seventh end of the first conducting wire and an eighth end of the second conducting wire.

8. The lens of claim 1, wherein a material of the lens tube is metal direct molding plastic, and wherein the antistatic structure is a conductive structure manufactured using a metal direct molding process.

9. The lens of claim 1, wherein a first resistivity of the antistatic structure is less than a second resistivity of the conductive layer.

10. The lens of claim 9, wherein a material of the antistatic structure is metal.

11. The lens of claim 1, wherein an edge of an orthographic projection of a part of the antistatic structure on a plane defined by the optical element proximate to the optical element coincides with an edge proximate to the optical element in the top surface covered by the part of the antistatic structure.

12. The lens of claim 1, further comprising a protective layer covering the antistatic structure.

13. The lens of claim 1, wherein the antistatic structure comprises:
a first electrode connection wire; and
a plurality of antistatic electrodes, wherein the antistatic electrodes are electrically coupled to each other through the first electrode connection wire, and wherein one of the antistatic electrodes is electrically coupled to the electrostatic conducting wire.

14. The lens of claim 1, wherein a material of the lens tube is metal direct molding plastic, and wherein the antistatic structure is a conductive coating manufactured using an electroplating process.

15. An active light emitting system comprising:
a bottom substrate; and
a lens mounted on the bottom substrate, wherein the lens comprises:
a lens tube comprising:
a top surface;
a tube wall;
an inner surface; and
an outer surface;
an optical element mounted in the lens tube and comprising a first surface that faces the same direction as the top surface;
a conductive layer disposed on the first surface; an antistatic structure disposed on the top surface;
an electrostatic conducting wire disposed inside the tube wall, on the inner surface, or on the outer surface, wherein the electrostatic conducting wire comprises:
a first end electrically coupled to the antistatic structure; and
a second end; and
a ground terminal disposed on the bottom substrate and coupled to the second end.

16. The active light emitting system of claim 15, wherein the antistatic structure comprises a frame-shaped conductive film electrically coupled to the electrostatic conducting wire, and wherein an orthographic projection of the frame-shaped conductive film on a plane defined by the optical element surrounds the conductive layer.

17. The active light emitting system of claim 15, wherein the antistatic structure comprises an antistatic electrode electrically coupled to the electrostatic conducting wire.

18. The active light emitting system of claim 15, wherein the antistatic structure comprises:
a first electrode connection wire; and
a plurality of antistatic electrodes, wherein the antistatic electrodes are electrically coupled to each other through the first electrode connection wire, and wherein one of the antistatic electrodes is electrically coupled to the electrostatic conducting wire.

19. The active light emitting system of claim 15, wherein the conductive layer comprises a detection line comprising a third end and a fourth end, wherein the lens further comprises a first conducting wire and a second conducting wire that are disposed inside the tube wall, on the inner surface, or the outer surface, wherein the first conducting wire couples the third end to an external positive terminal, wherein the second conducting wire couples the fourth end to an external negative terminal that is grounded, and wherein the electrostatic conducting wire and the second conducting wire are configured as a same conductive line.

20. A terminal comprising:
  an active light emitting system comprising:
    a bottom substrate; and
    a lens mounted on the bottom substrate, wherein the lens comprises:
      a lens tube comprising:
        a top surface;
        a tube wall;
        an inner surface; and
        an outer surface;
      an optical element mounted in the lens tube and comprising a first surface that faces the same direction as the top surface;
      a conductive layer disposed on the first surface;
      an antistatic structure disposed on the top surface;
      an electrostatic conducting wire disposed inside the tube wall, on the inner surface, or on the outer surface, wherein the electrostatic conducting wire comprises:
        a first end electrically coupled to the antistatic structure; and
        a second end; and
      a ground terminal disposed on the bottom substrate and coupled to the second end.

* * * * *